United States Patent
Lee et al.

(10) Patent No.: US 10,082,984 B2
(45) Date of Patent: Sep. 25, 2018

(54) STORAGE DEVICE AND METHOD OF OPERATING THE SAME

(71) Applicant: Samsung Electronics Co., Ltd., Suwon-si, Gyeonggi-do (KR)

(72) Inventors: Donghun Lee, Daegu (KR); Isaac Baek, Hwaseong-si (KR); Hyesung Kim, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 131 days.

(21) Appl. No.: 15/134,791

(22) Filed: Apr. 21, 2016

(65) Prior Publication Data

US 2017/0031631 A1 Feb. 2, 2017

(30) Foreign Application Priority Data

Jul. 27, 2015 (KR) .................. 10-2015-0106103

(51) Int. Cl.
*G06F 3/06* (2006.01)
*G06F 12/1009* (2016.01)
*G06F 13/42* (2006.01)
*G06F 17/30* (2006.01)
*G06F 12/02* (2006.01)

(52) U.S. Cl.
CPC ............ *G06F 3/0659* (2013.01); *G06F 3/061* (2013.01); *G06F 3/0688* (2013.01); *G06F 12/1009* (2013.01); *G06F 13/4282* (2013.01); *G06F 3/0604* (2013.01); *G06F 12/0246* (2013.01); *G06F 17/30312* (2013.01); *G06F 17/30516* (2013.01); *G06F 2212/2022* (2013.01); *G06F 2212/7201* (2013.01)

(58) Field of Classification Search
CPC ................... G06F 3/061; G06F 3/0688; G06F 2212/2022; G06F 17/30516; G06F 17/30312; G06F 12/0246; G06F 3/0604; G06F 3/0659

See application file for complete search history.

(56) References Cited

U.S. PATENT DOCUMENTS

| | | |
|---|---|---|
| 7,679,133 B2 | 3/2010 | Son et al. |
| 7,962,638 B2 | 6/2011 | Cherkauer et al. |
| 8,553,466 B2 | 10/2013 | Han et al. |
| 8,559,235 B2 | 10/2013 | Yoon et al. |
| 8,601,198 B2 | 12/2013 | Teh et al. |
| 8,654,587 B2 | 2/2014 | Yoon et al. |
| 8,839,196 B2 | 9/2014 | Clemm et al. |
| 8,868,824 B2 | 10/2014 | Sankar et al. |

(Continued)

FOREIGN PATENT DOCUMENTS

| | | |
|---|---|---|
| KR | 10-2009-0106476 | 10/2009 |
| KR | 10-2012-0022065 | 3/2012 |

*Primary Examiner* — Daniel Tsui
*Assistant Examiner* — Masud Khan
(74) *Attorney, Agent, or Firm* — Harness, Dickey & Pierce, P.L.C.

(57) ABSTRACT

A method of operating a storage device that controls input/output of multi-stream data according to a stream ID may include receiving, from a host, a stream control command controlling at least a first stream ID and a second stream ID, determining, in response to the received stream control command, a third stream ID including control commands for the first and second stream IDs, and transmitting the third stream ID to the host.

18 Claims, 32 Drawing Sheets

(56) References Cited

U.S. PATENT DOCUMENTS

| | | |
|---|---|---|
| 8,954,599 B2 | 2/2015 | Chang |
| 9,152,345 B2 | 10/2015 | Cherkauer et al. |
| 2009/0256817 A1* | 10/2009 | Perlin .................. G06F 3/0233 345/174 |
| 2010/0312801 A1* | 12/2010 | Ostrovsky ......... G06F 17/30224 707/803 |
| 2011/0145599 A1 | 6/2011 | Cherkauer et al. |
| 2011/0233648 A1 | 9/2011 | Seol et al. |
| 2012/0054420 A1 | 3/2012 | Kang et al. |
| 2013/0060993 A1 | 3/2013 | Park et al. |
| 2013/0080787 A1 | 3/2013 | Lee et al. |
| 2013/0198489 A1 | 8/2013 | Branson et al. |
| 2014/0006428 A1 | 1/2014 | Kang et al. |
| 2014/0344463 A1* | 11/2014 | Sadeghi ................ H04W 76/00 709/227 |
| 2016/0283125 A1* | 9/2016 | Hashimoto ....... G06F 17/30123 |
| 2016/0306552 A1* | 10/2016 | Liu ........................ G06F 3/061 |

* cited by examiner

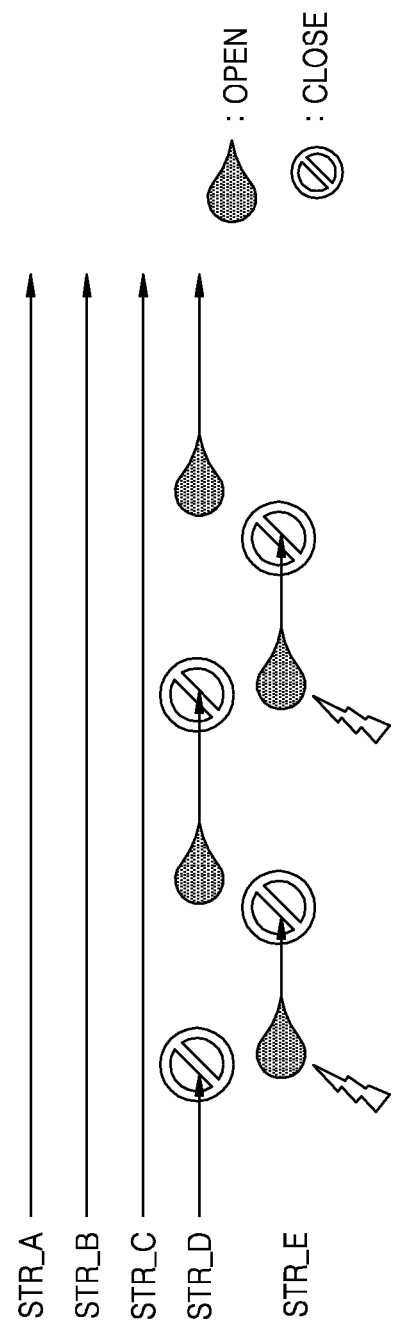

FIG. 14

STR CTR CMD

| Bit / Byte | 7 | 6 | 5 | 4 | 3 | 2 | 1 | 0 |
|---|---|---|---|---|---|---|---|---|
| 0 | OPERATION CODE ||||||||
| 1 | STR_CTL ||| Reserved | SERVICE ACTION ||||
| 2 | Reserved ||||||||
| 3 | ||||||||
| 4 | MSB ||| STR_ID |||||
| 5 | |||||||LSB|
| 6 | Reserved ||||||||
| ... | ||||||||
| 14 | ||||||||
| 15 | CONTROL ||||||||

FIG. 15

STR CTR parameter data

| Bit<br>Byte | 7 | 6 | 5 | 4 | 3 | 2 | 1 | 0 |
|---|---|---|---|---|---|---|---|---|
| 0 | PARAMETER LENGTH ||||||||
| 1<br>...<br>3 | Reserved ||||||||
| 4 | MSB | ASSIGNED_STR_ID |||||| |
| 5 | | |||||| LSB |
| 6<br>7 | Reserved ||||||||

FIG. 19

WRITE STR CMD

| Bit / Byte | 7 | 6 | 5 | 4 | 3 | 2 | 1 | 0 |
|---|---|---|---|---|---|---|---|---|
| 0 | OPERATION CODE ||||||||
| 1 | WRPROTECT ||| DPO | FUA | Reserved |||
| 2 | (MSB) |||||||  |
| ... | LOGICAL BLOCK ADDRESS ||||||||
| 9 | |||||||(LSB) |
| 10 | STR_ID ||||||||
| 11 | ||||||||
| 12 | (MSB) |||||||  |
| 13 | TRANSFER LENGTH |||||||(LSB) |
| 14 | Reserved |||| GROUP NUMBER ||||
| 15 | CONTROL ||||||||

FIG. 21

GET STR STATUS CMD

| Bit<br>Byte | 7 | 6 | 5 | 4 | 3 | 2 | 1 | 0 |
|---|---|---|---|---|---|---|---|---|
| 0 | OPERATION CODE |||||||||
| 1 | Reserved |||| SERVICE ACTION ||||
| 2 | Reserved ||||||||
| 3 | ||||||||
| 4 | (MSB) | STARTING STREAM IDENTIFIER |||||||
| 5 | | |||||| (LSB) |
| 6 | Reserved ||||||||
| ... | ||||||||
| 9 | ||||||||
| 10 | (MSB) | ALLOCATION LENGTH |||||||
| ... | ||||||||
| 13 | | |||||| (LSB) |
| 14 | Reserved ||||||||
| 15 | CONTROL ||||||||

FIG. 22

GET STR STATUS Parameter data

| Bit<br>Byte | 7 | 6 | 5 | 4 | 3 | 2 | 1 | 0 |
|---|---|---|---|---|---|---|---|---|
| 0 | (MSB) | | | | | | | |
| ... | | | STREAM LIST LENGTH | | | | | |
| 3 | | | | | | | | (LSB) |
| 4 | Reserved | | | | | | | |
| 5 | | | | | | | | |
| 6 | (MSB) | | NUMBER OF OPEN STREAMS | | | | | |
| 7 | | | | | | | | (LSB) |
| stream status descriptors | | | | | | | | |
| 8 | stream status descriptors [first] | | | | | | | |
| ... | | | | | | | | |
| 15 | | | | | | | | |
| ⋮ | | | | | | | | |
| n-8 | stream status descriptor [last] | | | | | | | |
| ... | | | | | | | | |
| n | | | | | | | | |

STORAGE DEVICE AND METHOD OF OPERATING THE SAME

CROSS-REFERENCE TO RELATED APPLICATION

This application claims the benefit of Korean Patent Application No. 10-2015-0106103, filed on Jul. 27, 2015, in the Korean Intellectual Property Office, the disclosure of which is incorporated herein in its entirety by reference.

BACKGROUND

Example embodiments of the inventive concepts relate to a memory device. For example, at least some example embodiments relate to a storage device and/or a method of operating the same.

A flash memory device has been widely used as a voice and image data storage medium included in information devices such as a computer, a smart phone, a personal digital assistant (PDA), a digital camera, a camcorder, a voice recorder, an MP3 player, and a handheld personal computer (PC). An example of a large-capacity storage device based on a flash memory is a solid state drive (SSD). With a sharp increase in demand for SSDs, SSDs have been used for various purposes. For example, an SSD may be used for a server, a client, a data center, or the like.

SUMMARY

According to an example embodiment of the inventive concepts, there is provided a method of operating a storage device that controls input/output of multi-stream data according to a stream ID, the method including: receiving, from a host, a stream control command controlling at least a first stream ID and a second stream ID; determining, in response to the stream control command, a third stream ID including control commands for the first and second stream IDs; and transmitting the third stream ID to the host.

According to another example embodiment of the inventive concepts, there is provided a method of operating a storage device that controls input/output of multi-stream data according to a stream ID, the method including: receiving, from a host, a stream control command merging a first stream ID and a second stream ID; merging the first and second stream IDs into a third stream ID in response to the received stream control command; receiving, from the host, a write stream command for stream data corresponding to the first stream ID or the second stream ID; and writing the stream data according to the third stream ID in response to the received write stream command.

According to another example embodiment of the inventive concepts, there is provided a method of operating a storage device that controls input/output of multi-stream data according to a stream ID, the method including: receiving, from the host, a stream control command merging a plurality stream IDs into a target stream ID; merging the plurality stream IDs into the target stream ID in response to the received stream control command; receiving, from the host, a write stream command for stream data corresponding to at least one of the plurality stream IDs; and writing the stream data according to the target stream ID in response to the received write stream command.

According to another example embodiment of the inventive concepts, a method of operating a storage device may include receiving, from a host, a first command requesting the storage device perform an operation on a data stream, the data stream being a stream of data having a unique stream ID associated therewith shared between the host and the storage device, the storage device configured to store the data in the data stream in a same block of the storage device; merging two or more of open streams to a merged stream such that at least one of the open streams is closed to form a closed stream, if a number of the open streams exceeds a threshold; assigning a stream ID to the merged stream; and notifying the host that the operation was performed on the stream ID associated with the merged stream.

In some example embodiments, the closed stream is not counted in the number of open streams.

In some example embodiments, the method further includes receiving, from the host, a second command requesting the storage device perform an operation on the closed stream; merging two or more of the open streams, if the number of the open streams exceeds the threshold; and opening the closed stream.

In some example embodiments, the assigning the stream ID to the merged stream comprises: determining a block having a relatively large amount of available space within the storage device; and assigning a stream ID of the block as the stream ID of the merged stream.

In some example embodiments, multi-stream data and associated external stream IDs are transmitted between the host and the storage device via a single channel, and the method further includes generating a mapping table that maps the external stream IDs with internal stream IDs associated with blocks of the storage device.

BRIEF DESCRIPTION OF THE DRAWINGS

Example embodiments of the inventive concepts will be more clearly understood from the following detailed description taken in conjunction with the accompanying drawings in which:

FIG. 4A illustrates an example in which a stream ID merge operation is not applied;

FIG. 14 illustrates a format of a stream control command according to an example embodiment;

FIG. 15 illustrates a format of stream control parameter data according to an example embodiment;

FIG. 19 illustrates a format of a write stream command according to an example embodiment;

FIG. 21 illustrates a format of a get stream status command according to an example embodiment;

FIG. 22 illustrates a format of get stream status parameter data according to an example embodiment;

DETAILED DESCRIPTION

Figure 1:
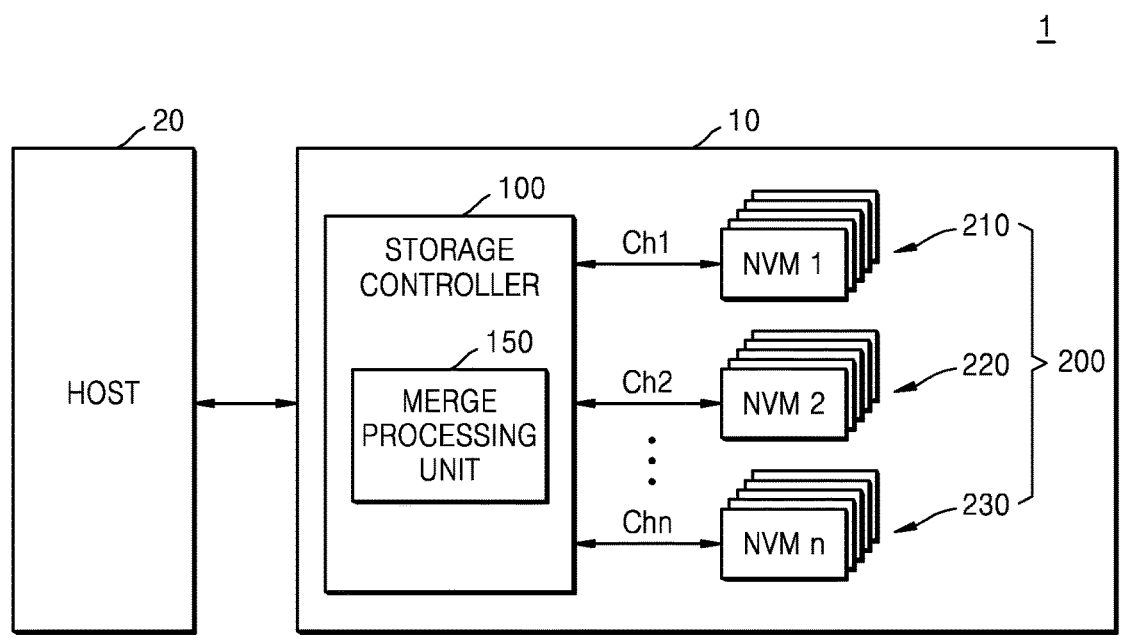
FIG. 1 is a schematic block diagram illustrating a system according to an example embodiment.

Example embodiments of the inventive concepts will now be described more fully with reference to the accompanying drawings, in which example embodiments of the inventive concepts are shown. Example embodiments of the inventive concepts may, however, be embodied in many different forms and should not be construed as being limited to the example embodiments set forth herein; rather, these example embodiments are provided so that this disclosure will be thorough and complete, and will fully convey the concept of the inventive concept to those skilled in the art. However, this is not intended to limit the example embodiments of the inventive concepts to particular modes of practice, and it is to be appreciated that all changes, equivalents, and substitutes that do not depart from the spirit and technical scope of the inventive concept are encompassed in the inventive concept. Like reference numerals in the drawings denote like elements, and thus their description will be omitted. In the drawings, the thicknesses of layers and regions are exaggerated for clarity.

The terms used in the present specification are merely used to describe example embodiments, and are not intended to limit the inventive concepts. An expression used in the singular encompasses the expression of the plural, unless it has a clearly different meaning in the context. In the present specification, it is to be understood that the terms such as "including", "having", and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

It will be understood that although the terms first and second are used herein to describe various elements, these elements should not be limited by these terms. These terms are only used to distinguish one element from another element. Thus, a first element discussed below could be termed a second element, and similarly, a second element may be termed a first element without departing from the teachings of this disclosure.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term " . . . module" may be hardware for performing functions and operations described herein, a program code for performing certain functions and operations, or an electronic recording medium, for example, a processor, including a computer program code capable of performing certain functions and operations. In other words, the module may be hardware for implementing the inventive concept and/or a functional and/or structural combination of software for operating the hardware. The module may be referred to as a device.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

FIG. 1 is a schematic block diagram illustrating a system according to an example embodiment.

Referring to FIG. 1, a system 1 may include a storage device 10 and a host 20. The system 1 may be embodied as a personal computer (PC), a data server, a network-attached storage (NAS), a portable electronic device, or the like. The portable electronic device may be embodied as a laptop computer, a portable cell phone, a smart phone, a tablet PC, a personal digital assistant (PDA), an enterprise digital assistant (EDA), a digital still camera, a digital video camera, a portable multimedia player (PMP), a personal navigation device (PND), a handheld game console, an e-book, or the like.

The storage device 10 may be a solid state drive (SSD), but is not limited thereto. The storage device 10 may be a flash memory device, an embedded multimedia card (eMMC), a universal flash storage (UFS), a redundant array of independent disk (RAID), or the like.

The host 20 writes data to the storage device 10 or reads data stored in the storage device 10. In detail, the host 20 may generate a write command that requests the storage device 10 to write the data or a read command that requests reading of the data stored in the storage device 10. The write command or read command may be referred to as an input/output (I/O) command.

In at least some example embodiments, the host 20 may generate a stream write command or a stream read command including a stream ID with regard to multi-stream data. The multi-stream data may include stream data, each piece of which corresponds to a stream ID. In at least some example embodiments, the storage device 10 may receive the stream write command or stream read command from the host 20 and may perform a multi-stream write operation or a multi-stream read operation by controlling input/output of the multi-stream data in accordance with the stream ID included in the received stream write command or stream read command.

In at least some example embodiments, the storage device 10 may receive, from the host 20, a stream control command controlling at least a first stream ID and a second stream ID, determine a third stream ID including control commands for the first stream ID and the second stream ID in response to the stream control command, and transmit the third stream ID to the host 20. For example, the stream control command merges the first stream ID and the second stream ID and may be a stream ID merge command including the first stream ID and the second stream ID. For example, the first stream ID and the second stream ID are merged into a third stream ID, and the third stream ID may be a post-merge stream ID.

In an example embodiment, the storage device 10 may receive, from the host 20, a stream control command merging stream IDs into a target stream ID and may merge the stream IDs into the target stream ID in response to the stream control command. Then, the storage device 10 may receive, from the host 20, a write stream command for stream data corresponding to at least one of the stream IDs and may write the stream data according to the target stream ID in response to the write stream command.

Figure 2:
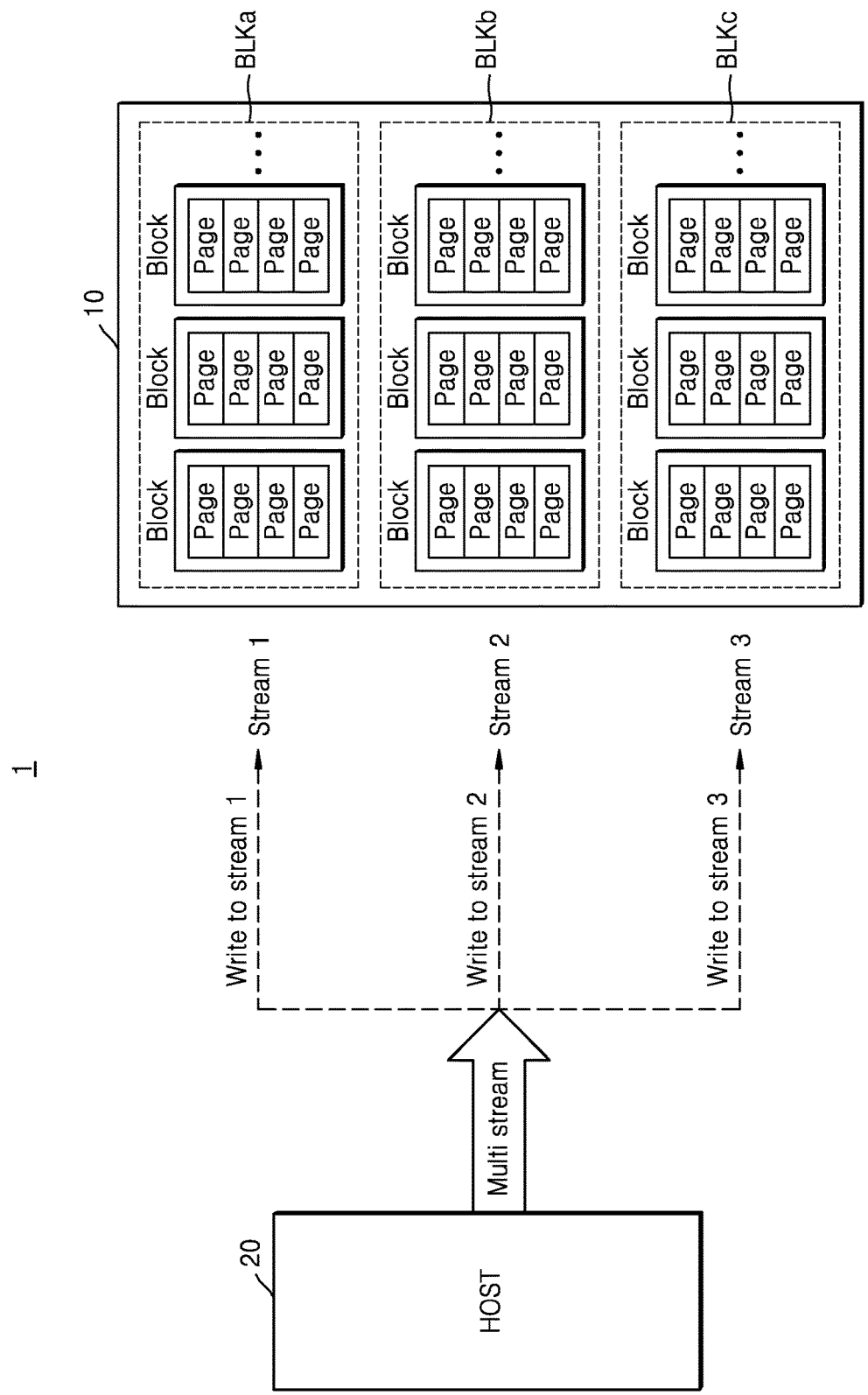
FIG. 2 schematically illustrates a multi-stream write operation according to an example embodiment.

FIG. 2 schematically illustrates a multi-stream write operation according to an example embodiment.

Referring to FIG. 2, the host 20 may provide multi-stream data to the storage device 10. In some example embodiments, the host 20 may assign, to the same stream, pieces of data having life expectancies equal or similar to one another and may generate multi-stream data by assigning pieces of data having different life expectancies to different streams. In some example embodiments, for data assigned to the same stream, the storage device 10 may store the data in blocks corresponding to the stream, and for data assigned to different streams, the storage device 10 may store the data in different blocks respectively corresponding to the streams.

For example, the multi-stream data may include stream data corresponding to a first stream, stream data corresponding to a second stream, and stream data corresponding to a third stream. The storage device 10 may store the stream data corresponding to the first stream in blocks BLKa corresponding to the first stream, store the stream data corresponding to the second stream in blocks BLKb corresponding to the second stream, and store the stream data corresponding to the third stream in blocks BLKc corresponding to the third stream.

Figure 3:
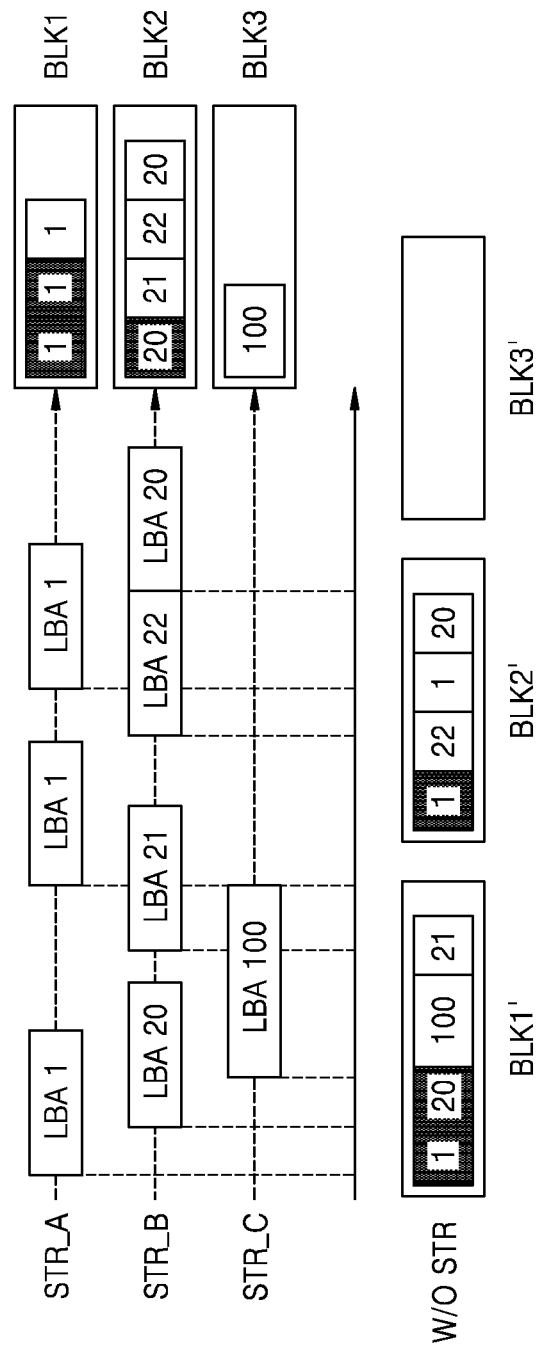
FIG. 3 illustrates a normal write operation and a multi-stream write operation according to an example embodiment.

FIG. 3 illustrates a normal write operation, and a multi-stream write operation according to an example embodiment.

Referring to FIG. 3, a bottom portion of FIG. 3 illustrates storage of blocks of data according to a normal write operation. In a normal write operation, a data write operation may be performed in response to a write command that does not include a stream ID. Accordingly, blocks in which data is stored may be determined according to a data input order. In detail, pieces of data corresponding to logical block addresses (LBA), that is, logical block addresses LBA1, LBA20, LBA100, and LBA21, which are sequentially input are stored in a first block BLK1', and pieces of data corresponding to logical block addresses LBA1, LBA22, LBA1, and LBA20 may be stored in a second block BLK2'.

A right portion of FIG. 3 illustrates storage of blocks of data according to a multi-stream write operation. In a multi-stream write operation according to some example embodiments, the data write operation may be performed in response to a write stream command including the stream ID. Accordingly, pieces of data may be stored in different blocks according to stream IDs. Thus, the blocks in which the multi-stream data is stored may differ according to the stream IDs instead of the data input order.

For example, logical block addresses LBA of the stream data corresponding to the first stream STR_A may all be the logical block address LBA1, and logical block addresses of the stream data corresponding to the second stream STR_B may sequentially be logical block addresses LBA20, LBA21, LBA22, and LBA20. Logical block addresses of the stream data corresponding to the third stream STR_C may be a logical block address LBA100.

In detail, a stream ID of the first stream STR_A may be A, and stream data corresponding to the first stream STR_A may be stored in the first block BLK1 corresponding to a first stream ID(A). Also, a stream ID of the second stream STR_B may be B, and stream data corresponding to the second stream STR_B may be stored in the second block BLK2 corresponding to a second stream ID(B). Also, a stream ID of the third stream STR_C may be C, and stream data corresponding to the third stream STR_C may be stored in the third block BLK3 corresponding to a third stream ID(C).

Referring back to FIG. 1, the storage device 10 may include a storage controller 100 and a non-volatile memory 200.

The non-volatile memory 200 may include non-volatile memory devices 210, 220, and 230.

The non-volatile memory 200 may be a Read Only Memory (ROM), a Programmable Read Only Memory (PROM), an Erasable Programmable Read Only Memory (EPROM), or a flash memory.

In some example embodiments, the non-volatile memory 200 may be a three dimensional (3D) memory array. The 3D memory array may be monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In some example embodiments, the 3D memory array may include vertical NAND strings that are vertically oriented such that at least one memory cell is located over another memory cell. The at least one memory cell may comprise a charge trap layer.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

The storage controller 100 may control the non-volatile memory 200 in order to read data stored in the non-volatile memory 200 or write data to the non-volatile memory 200 in response to a read/write command from the host 20. In detail, the storage controller 100 may control write, read, and erase operations performed on the non-volatile memory 200 by providing an address, a command, and a control signal to the non-volatile memory 200. Also, data for the write operation and read data may be exchanged between the storage controller 100 and the non-volatile memory 200.

In some example embodiments, the storage controller 100 executes software that configures the storage controller 100 to perform the operations of a merge processing unit 150.

When a stream control command merging at least two stream IDs from among open stream IDs is received from the host 20, the merge processing unit 150 may merge the at least two stream IDs based on the received stream control command. The stream control command may be a stream ID merge command.

The merge processing unit 150 may merge at least two stream IDs into a stream ID different from the at least two stream IDs. The stream ID which the at least two stream IDs are merged into may be a post-merge stream ID. The merged stream IDs are not included in an open stream count, but the post-merge stream ID may be included therein.

In some example embodiments, the post-merge stream ID may be determined by the host 20, and the stream ID merge command may include the post-merge stream ID. In other example embodiments, the post-merge stream ID may be determined by the storage controller 100, and the stream ID merge command may not include the post-merge stream ID. In this case, the storage controller 100 may transmit the determined post-merge stream ID to the host 20.

For example, the stream ID merge command may instruct merging of a first stream ID and a second stream ID, and accordingly, the merge processing unit 150 may merge the first stream ID and the second stream ID with each other. For example, the post-merge stream ID is the first stream ID, and the merge processing unit 150 may merge the second stream ID into the first stream ID. In this case, the second stream ID is a merged stream ID and is not included in the open stream count. As another example, if the post-merge stream ID is the second stream ID, the merge processing unit 150 may merge the first stream ID into the second stream ID. In this case, the first stream ID is a merged stream ID and is not included in the open stream count. As another example, the post-merge stream ID may be a third stream ID, and the merge processing unit 150 may merge the first and second stream IDs into the third stream ID. In this case, the first and second stream IDs are merged stream IDs and are not included in the open stream count.

As an example, the stream ID merge command may instruct merging of the second stream ID to an nth stream ID into the first stream ID, and the merge processing unit 150 may merge the second stream ID to the nth stream ID into the first stream ID. Here, n is a natural number greater than 2. In this case, the second stream ID to the nth stream ID are merged stream IDs and are not included in the open stream count. As the post-merge stream ID, for example, the first stream ID, is already included in the stream ID merge command, it is unnecessary for the storage controller 100 to transmit the post-merge stream ID to the host 20.

FIG. 4A illustrates an example in which a stream ID merge operation is not applied.

Referring to FIG. 4A, when a maximum value of an open stream count is 4, and first to fourth streams STR_A to STR_D are open, if it is required to open a new stream, that is, a fifth stream STR_E, one of the first to fourth streams STR_A to STR_D that are open, for example, the fourth stream STR_D, has to be closed. After the fifth stream STR_E is open, when a write stream command for stream data corresponding to the closed fourth stream STR_D is received, there is a need to close the open fifth stream STR_E in order to re-open the closed fourth stream STR_D.

In this case, it is considered that stream data which corresponds to the fourth stream STR_D and is input before the fourth stream STR_D is closed is not identical to stream data which corresponds to the fourth stream STR_D and is input after the fourth stream STR_D is re-open. Therefore, a reduction effect of a write amplification factor (WAF), which may be achieved through the multi-stream write operation, may be decreased, and unnecessary overhead, for example, performance of an unnecessary background operation, may result.

Figure 4B:
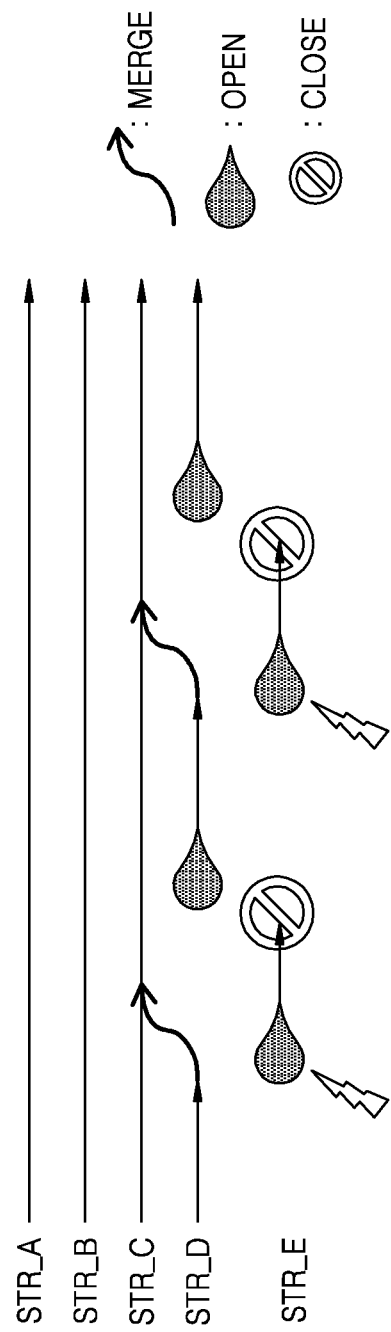
FIG. 4B illustrates an example in which a stream ID merge operation is applied, according to an example embodiment.

FIG. 4B illustrates an example in which a stream ID merge operation is applied, according to an example embodiment.

Referring to FIG. 4B, when a maximum value of the open stream count is 4, and first to fourth streams STR_A to STR_D are open, if it is required to open a new stream, that is, the fifth stream STR_E, the merge processing unit 150 may merge one of the first to fourth streams STR_A to STR_D that are open, for example, the fourth stream STR_D, into another one of the first to fourth streams STR_A to STR_D, for example, the third stream STR_C.

In this case, following the merger, the fourth stream STR_D is a merged stream ID and therefore is not included in the open stream count, and the third stream STR_C is a post-merge stream ID and therefore is included in the open stream count. Therefore, although the fifth stream STR_E is open, the total open stream count is 4, which is less than the maximum value of the open stream count.

Figure 5A:
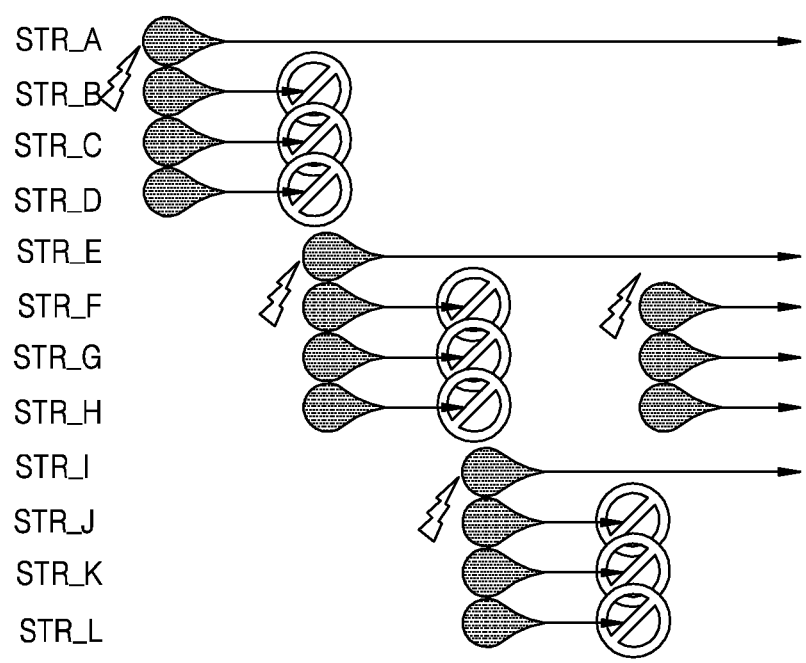
FIG. 5A illustrates an example in which a stream ID merge operation is not applied.

FIG. 5A illustrates another example in which a stream ID merge operation is not applied.

Referring to FIG. 5A, when the first to fourth streams STR_A to STR_D are open, if it is required to open new streams, that is, fifth to eighth streams STR_E to STR_H, there is a need to close some of the first to fourth streams STR_A to STR_D that are open, for example, the second to fourth streams STR_B to STR_D. After the fifth to eighth streams STR_E to STR_H are open, if it is required to open new streams, that is, ninth to twelfth steams STR_I to STR_L, there is a need to close some of the fifth to eighth streams STR_E to STR_H that are open, for example, the sixth to eighth streams STR_F to STR_H. Then, when the tenth to twelfth steams STR_J to STR_L are closed, the closed sixth to eighth streams STR_F to STR_H may be re-open.

In this case, it is considered that respective pieces of stream data which corresponds to the sixth to eighth streams STR_F to STR_H and are input before the sixth to eighth streams STR_F to STR_H are closed are not are not identical to respective pieces of stream data which corresponds to the sixth to eighth streams STR_F to STR_H and are input after the sixth to eighth streams STR_F to STR_H are re-open. Therefore, the reduction effect of the WAF, which may be achieved through the multi-stream write operation, may be decreased, and unnecessary overhead, for example, performance of an unnecessary background operation, may result.

Figure 5B:
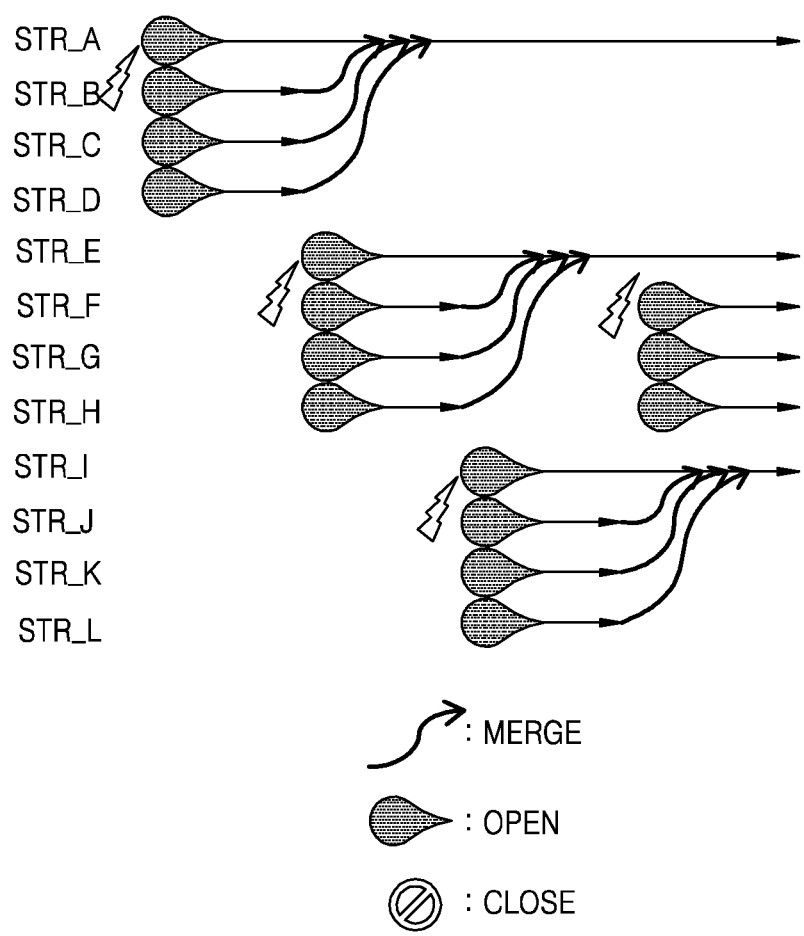
FIG. 5B illustrates an example in which a stream ID merge operation is applied, according to an example embodiment.

FIG. 5B illustrates an example in which a stream ID merge operation is applied, according to an example embodiment.

Referring to FIG. 5B, when the first to fourth streams STR_A to STR_D are open, if it is required to open new streams, that is, the fifth to eighth streams STR_E to STR_H, the host 20 may transmit a stream ID merge command to the storage device 10. Accordingly, the merge processing unit 150 may merge some of the first to fourth streams STR_A to STR_D that are already open, for example, the second to fourth streams STR_B to STR_D, into others of the first to fourth streams STR_A to STR_D, for example, the first stream STR_A. In this case, following the merger, the second to fourth streams STR_B to STR_D are not included in the open stream count as merged stream IDs, and the first stream STR_A is included in the open stream count as a post-merge stream ID.

After the fifth to eighth streams STR_E to STR_H are open, if it is required to open new streams, that is, the ninth to twelfth streams STR_I to STR_L, the host 20 may transmit a stream ID merge command to the storage device 10. Accordingly, the merge processing unit 150 may merge some of the fifth to eighth streams STR_E to STR_H that are already open, for example, the sixth to eighth streams STR_F to STR_H, into another one of the fifth to eighth streams STR_E to STR_H, for example, the fifth stream STR_E. In this case, following the merger, the sixth to eighth streams STR_F to STR_H are not included in the open stream count as merged stream IDs, and the fifth stream STR_E is included in the open stream count as a post-merge stream ID.

After the ninth to twelfth streams STR_I to STR_L are open, the host 20 may transmit a stream ID merge command to the storage device 10. Accordingly, the merge processing unit 150 may merge some of the ninth to twelfth streams STR_I to STR_L that are already open, for example, the tenth to twelfth streams STR_J to STR_L, into another one of the ninth to twelfth streams STR_I to STR_L, for example, the ninth stream STR_I. In this case, following the merger, the tenth to twelfth streams STR_J to STR_L are not included in the open stream count as merged stream IDs, and the ninth stream STR_I is included in the open stream count as a post-merge stream ID.

Then, the host 20 may transmit a stream open command for the fifth to eighth streams STR_E to STR_H to the storage device 10. Accordingly, the merge processing unit 150 finishes preparing to write the pieces of the stream respectively corresponding to the fifth to eighth streams STR_E to STR_H so as to complete the merging of the fifth to eighth streams STR_E to STR_H, and the non-volatile memory 200 may store the pieces of the stream respectively corresponding to the fifth to eighth streams STR_E to STR_H in blocks respectively corresponding thereto.

Figure 6:
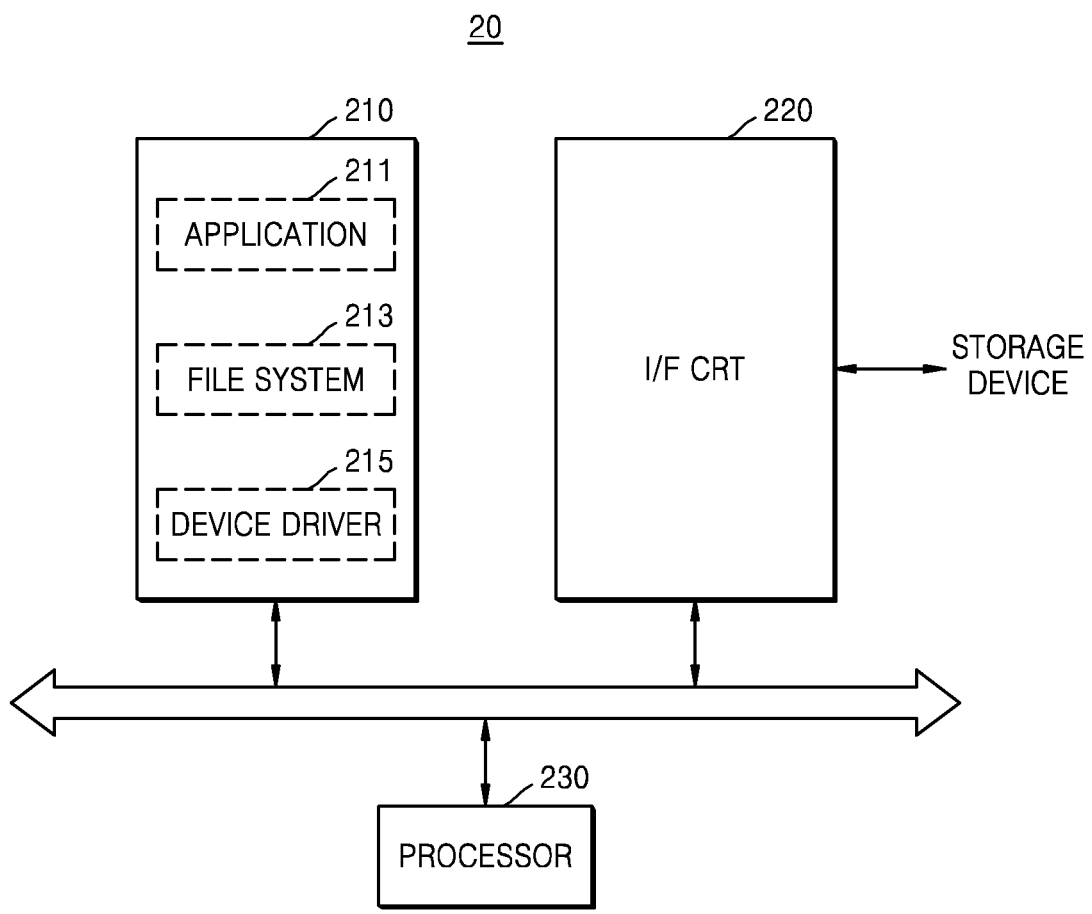
FIG. 6 is a block diagram illustrating a host included in the system of FIG. 1.

FIG. 6 is a block diagram illustrating the host 20 included in the system 1 of FIG. 1.

Referring to FIG. 6, the host 20 may include a working memory 210, an interface circuit 220, and a processor 230.

The working memory 210 may be a non-volatile memory, a volatile memory, a hard disk, an optical disk, and a combination of two or more of the above-mentioned devices. The memory may be a non-transitory computer readable medium. The non-transitory computer-readable media may also be a distributed network, so that the program instructions are stored and executed in a distributed fashion. The non-volatile memory may be a Read Only Memory (ROM), a Programmable Read Only Memory (PROM), an Erasable Programmable Read Only Memory (EPROM), or a flash memory. The volatile memory may be a Random Access Memory (RAM).

An application program 211, a file system 213, a device driver 215, and the like may be loaded on the working memory 210. However, example embodiments of the inventive concepts are not limited thereto, and various software programs for driving the host 20 may be loaded on the working memory 210. The interface circuit 220 may provide a physical connection between the host 20 and the storage device 10. That is, the interface circuit 220 may convert commands, addresses, data, or the like corresponding to various access requests generated by the host 20 into a format compatible with a storage device 20.

An interfacing method of the interface circuit 220 may be at least one of a Universal Serial Bus (USB), a Small Computer System Interface (SCSI), Peripheral Component Interconnect (PCI) express, Advanced Technology Attachment (ATA), Parallel-ATA (PATA), Serial-ATA (SATA), Serial Attached SCSI (SAS), and NVMe.

The processor 230 may be implemented by at least one semiconductor chip disposed on a printed circuit board. The processor 230 may be an arithmetic logic unit, a digital signal processor, a microcomputer, a field programmable array, a programmable logic unit, a microprocessor or any other device capable of responding to and executing instructions in a defined manner.

The processor 230 may execute software (e.g., an application program, an operating system (OS), a device driver, etc.) to be performed by the host 20. In detail, the processor 230 may execute an OS loaded on the working memory 210 and various application programs working based on the OS. The processor 230 may be a Homogeneous Multi-Core Processor or a Heterogeneous Multi-Core Processor.

Each application program executed by the processor 230 may execute at least one thread, and the thread may generate stream data, for example, a media file. The host 20 may transmit, to the storage device 10, a request for writing multi-stream data to the storage device 10 when threads are executed. It may be advantageous to manage stream data as continuous pieces of data within the storage device 10. Therefore, the host 20 may assign stream IDs to the pieces of the stream data requested to be written to a thread unit. The assigned stream ID may be added to a command generated by the interface circuit 220.

Figure 7:
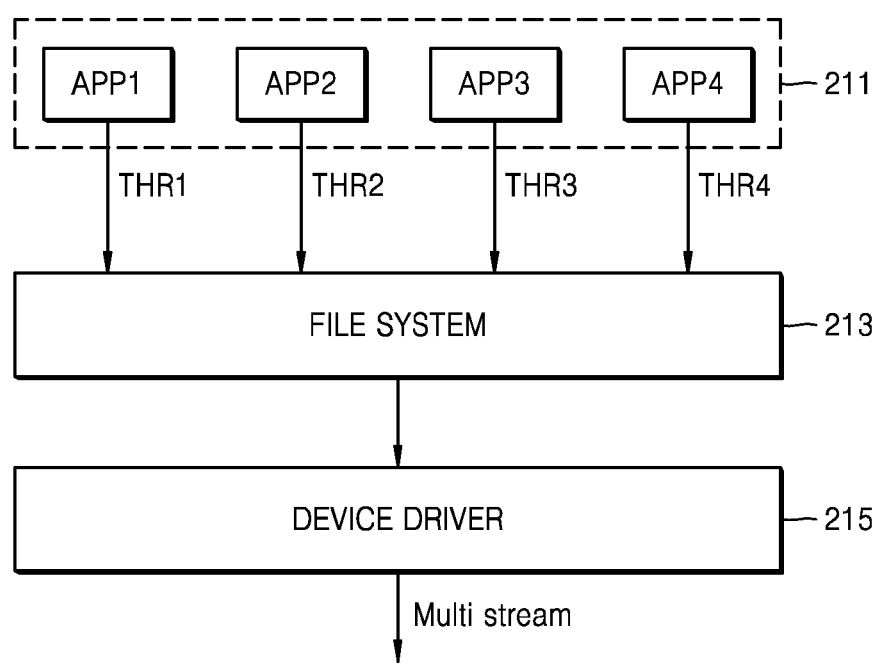
FIG. 7 is a block diagram illustrating a software hierarchical structure of the host of FIG. 6.

FIG. 7 is a block diagram illustrating a software hierarchical structure of the host of FIG. 6.

Referring to FIG. 7, software of the host 20 that is loaded on the working memory 210 and executed by the processor 230 may be classified into the application program 211, the file system 213, and the device driver 215. Here, the file system 213 and the device driver 215 may be included in Kernel of an OS.

The application program 211 is high-level software provided as a basic service or executed upon a request of the user. Application programs APP1, APP2, APP3, and APP4 may be simultaneously executed to provide various services. The application programs APP1, APP2, APP3, and APP4 may be executed by the processor 230 after being loaded on the working memory 210. For example, when a user requests reproduction of a moving image file, the processor 230 executes an application program (e.g., a video player) for reproducing the moving image. Then, the executed application program may generate a read request or a write request for reproducing the moving image and transmit the generated read request or write request to the storage device 10. In this case, a thread corresponding to a write operation performed by the application program may be generated. The thread may produce a request for writing stream data corresponding to a file to the storage device 10. The stream data corresponding to the file may be divided into multiple segments and may be requested to be written to the storage device 10.

When requests for writing media files are made, a request for writing pieces of the stream data respectively generated by threads THR1, THR2, THR3, and THR4 to the storage device 10 is made. In this case, in response to each request, each application program 211, executed by the processor 230, may assign a stream ID to the pieces of stream data corresponding to said stream ID. That is, a first stream ID may be assigned to a file generated by the first thread THR1. The file generated by the first thread THR1 may be transmitted to the storage device 10 in segments. The pieces of the stream data respectively generated by the threads THR1, THR2, THR3, and THR4 may be referred to as multi-stream data.

The file system 213 manages data in a file format corresponding to an OS. For example, the file system 213 may assign a file name, a filename extension, a file attribute, a file size, cluster information, etc. of a media file, which is requested to be written, in response to requests from the application programs 211. The file system 213 may support all access operations of the host 20 in order to process data as a file according to a read or write request transmitted to the storage device 10. The file system 213 includes a collection of abstract document structures used to hierarchically store, retrieve, access, and manipulate documents. For example, MICROSOFT WINDOWS operating in a PC uses a File allocation table (FAT) or an NT file system (NTFS) as the file system 213. Data in a file unit may be generated, deleted, and managed by the file system 213.

The device driver 215 is a control module used to control the storage device 10 at the OS level. When a memory access request is transmitted by a user or an application program 211, the device driver 215 starts operating. The device driver 215 may be provided as a software module of the Kernel for controlling the storage device 10.

Figure 8:
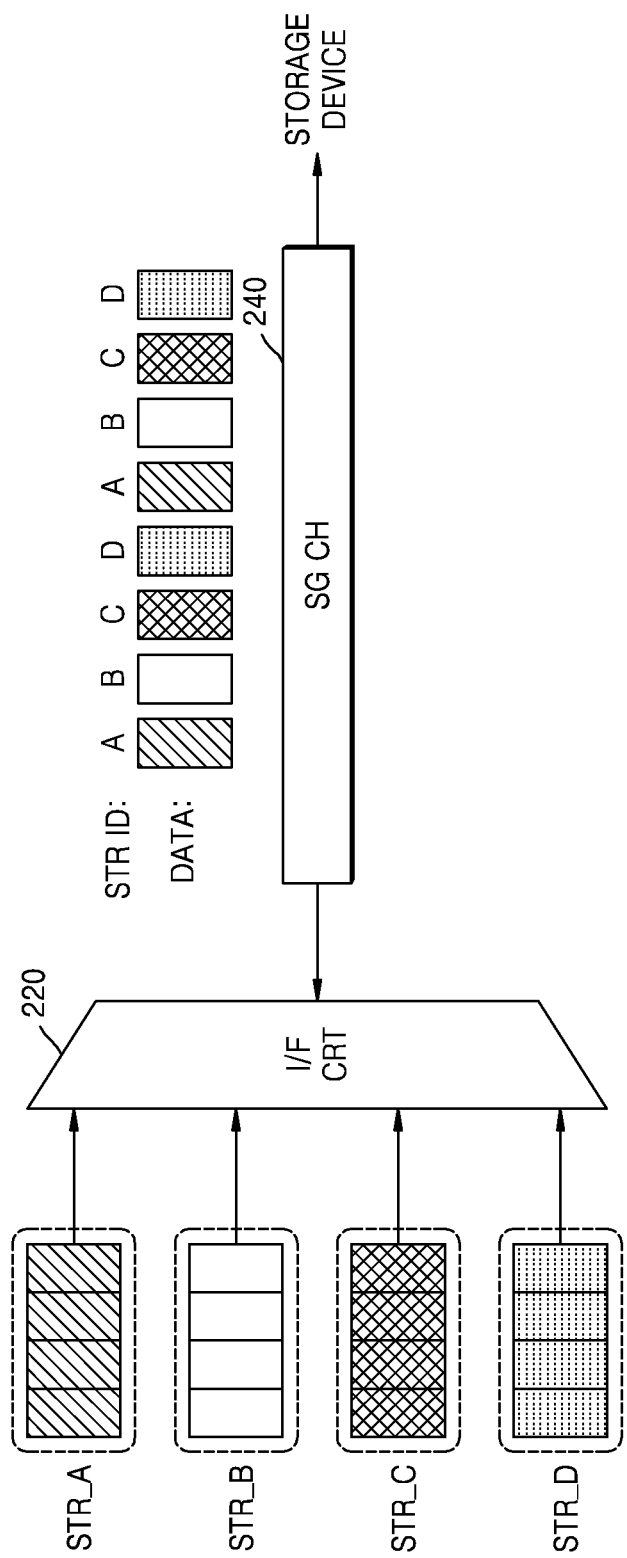
FIG. 8 illustrates an example in which multi-stream data is transmitted to a storage device, according to an example embodiment.

FIG. 8 illustrates an example in which multi-stream data is transmitted to the storage device 10, according to an example embodiment.

Referring to FIG. 8, since one channel 240 exists between the host 20 and the storage device 10, it may be difficult to simultaneously transmit pieces of multi-stream data to the storage device 10. Accordingly, the multi-stream data may be transmitted to the storage device 10 together with a stream ID. The host 20 may transmit, to the storage device 10, a request for writing four pieces of stream data corresponding to threads THR1 to THR4 which are executed by application programs 211.

First to fourth stream IDs A to D are respectively assigned to write commands for first to fourth pieces of the stream data STR_A to STR_D and are transmitted to the storage device 10. For convenience, pieces of multi-stream data are sequentially transmitted in an ascending order with respect to the stream IDs, but the pieces of multi-stream data may be transmitted in any order based on various priorities. The storage device 10 may manage the multi-stream data in a stream ID unit with reference to the stream IDs. Therefore, continuous write or read performance may be improved.

Figure 9:
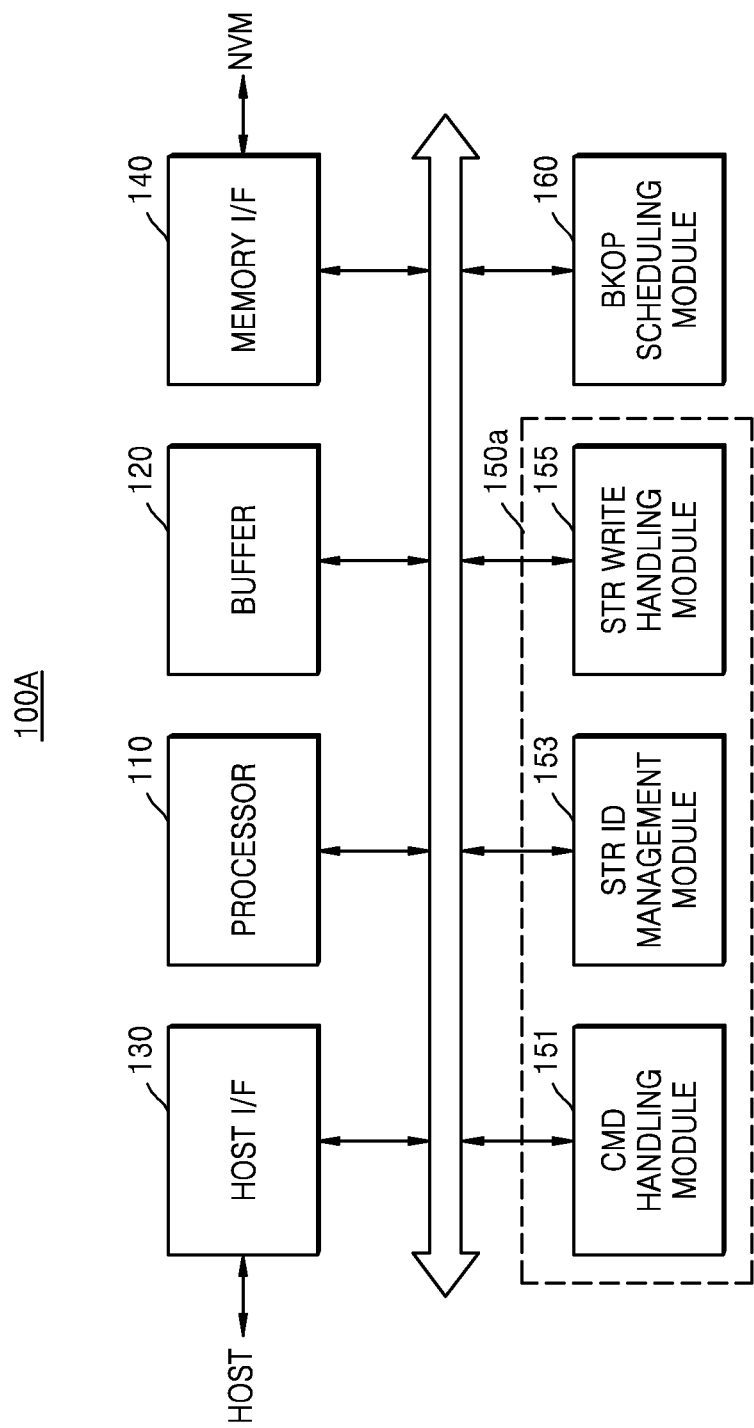
FIG. 9 is a block diagram illustrating an example of a storage controller included in the system of FIG. 1.

FIG. 9 is a block diagram illustrating an example of a storage controller 100A included in the system of FIG. 1.

Referring to FIG. 9, the storage controller 100A may include a processor 110, a buffer 120, a host interface 130, a memory interface 140, a merge operation processing module 150a, and a background operation scheduling module 160.

The processor 110 may be implemented by at least one semiconductor chip disposed on a printed circuit board. The processor 110 may be an arithmetic logic unit, a digital signal processor, a microcomputer, a field programmable array, a programmable logic unit, a microprocessor or any other device capable of responding to and executing instructions in a defined manner.

The processor 110 may control overall operations of the storage controller 100A. In detail, the processor 110 may transmit, to the host interface 130 and the memory interface 140, control information necessary for a write/read operation for the non-volatile memory 200.

The buffer 120 may include at least one general-use memory device including software and data for driving the storage device 10. The buffer 120 may include cache, ROM, PROM, EPROM, EEPROM, PRAM, flash memory, SRAM, or DRAM. Also, the buffer 120 may be used to temporarily store data to be stored in the non-volatile memory 200 or read therefrom.

The host interface 130 may provide physical connection between the host 20 and the storage device 10. For example, the host interface 130 may communicate with the host 20 via at least one of various interface protocols, for example, USB, MMC, PCI-E, ATA, Serial-ATA, Parallel-ATA, SCSI, ESDI, and integrated drive electronics (IDE).

The memory interface 140 exchanges data with non-volatile memories 210, 220 and 230. The memory interface 140 writes data, which is transmitted from the buffer 120, to the non-volatile memories 210, 220 and 230 via respective channels CH1 to CHn. The read data provided from the non-volatile memories 210, 220 and 230 via the channels are consolidated. The consolidated data will be stored in the buffer 120.

The processor 110 may execute instructions that configure the processor 110 to perform the functions of a merge operation processing module 150a, for example, the processor 110 may perform the functions of a command handling module 151, a stream ID management module 153, and a string write handling module 155.

Figure 11:
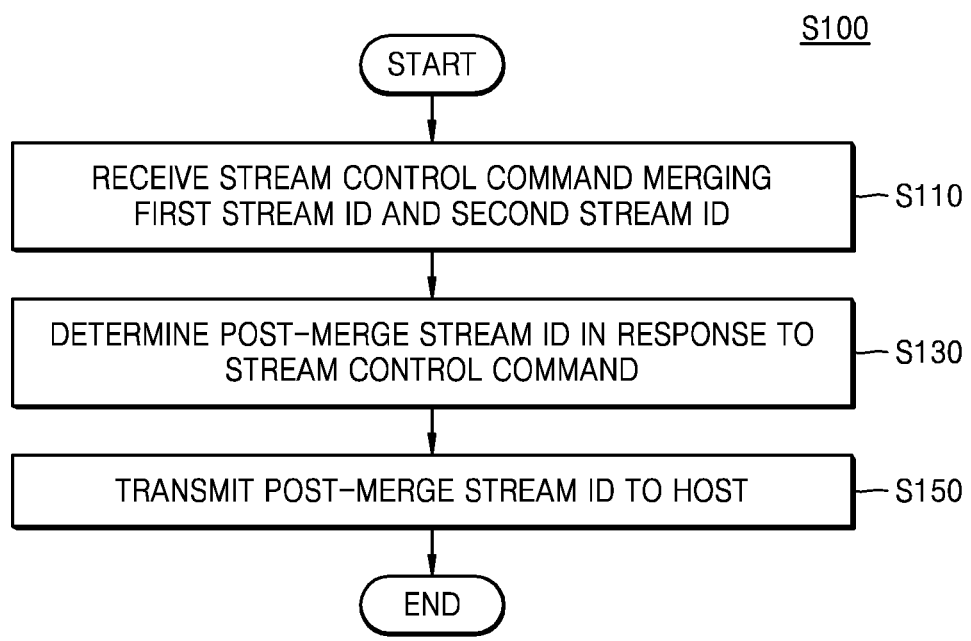
FIG. 11 is a flowchart illustrating a method of operating a storage device according to an example embodiment.
Figure 26:
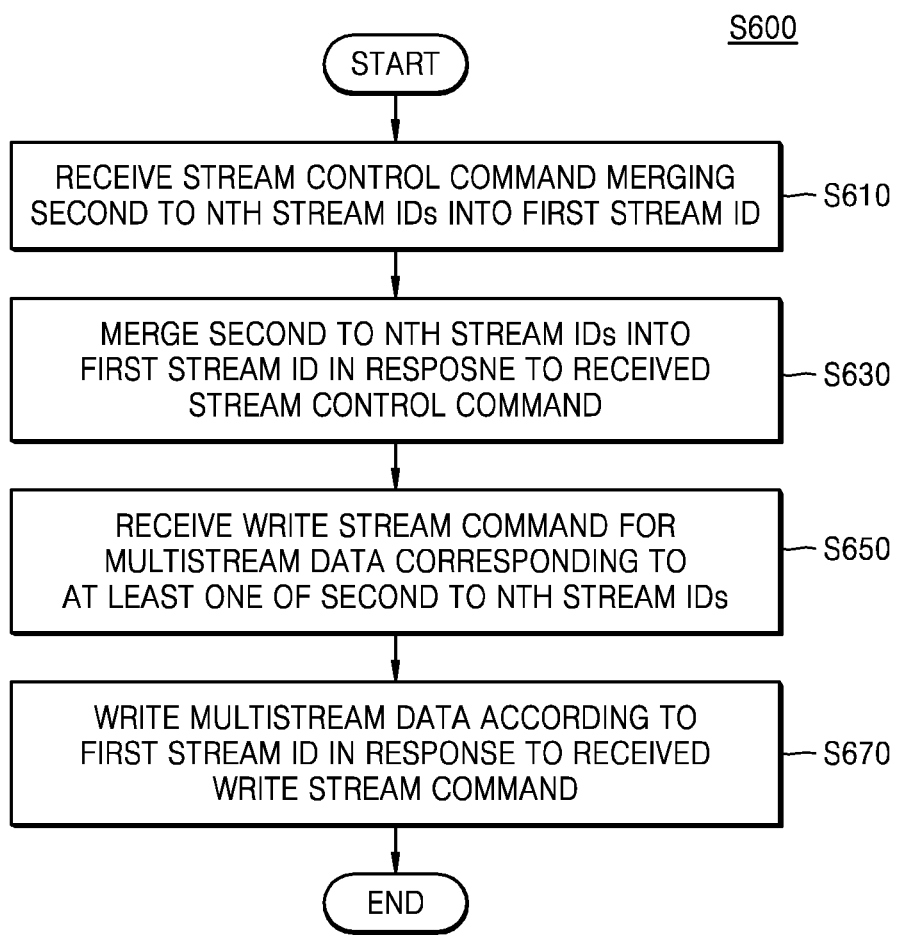
FIG. 26 is a flowchart illustrating a method of operating a storage device according to an example embodiment.

The processor 110 may be programmed with instructions that configure the processor 110 into a special purpose computer to perform the operations illustrated in one or more of FIGS. 11 and 26 and the sub routines associated therewith such that the processor 110 is configured to merge two or more of the open streams to a merged stream such that at least one of the open streams is closed to form a closed stream, if a number of the open streams exceeds a threshold; assign a stream ID to the merged stream; and notify the host that the operation was performed on the stream ID associated with the merged stream.

Therefore the processor 110 may improve the functioning of the storage controller 100 by improving the multi-stream write operation by merging streams together to free resources for additional streams.

The command handling module 151 may parse the command received from the host 20. In particular, the command handling module 151 parses the stream control command and may determine whether the stream control command is an open stream command, a close stream command, or a stream ID merge command.

The stream ID management module 153 may determine a stream ID based on the parsed stream control command. In this case, the determined stream ID is an external stream ID, and the stream ID management module 153 may map the external stream ID to an internal stream ID. The external stream ID is an external ID received/transmitted via a channel between the host 20 and the storage device 10, and the internal stream ID is an internal ID received/transmitted within the storage device 10. Thus, the stream ID management module 153 may generate a mapping table which maps the external stream ID associated with the stream control command and the internal stream ID, and may store the mapping table in the buffer 120.

Also, the stream ID management module 153 may differentiate stream IDs which have been merged through a merge operation and are not included in the open stream count from other stream IDs and then may update the stream ID information. The stream ID management module 153 may store the updated stream ID information in the buffer 120. The updated stream ID information may be implemented in a portion of the mapping table.

For example, when the first and second stream IDs are merged into the third stream ID, the first and second stream IDs are stream IDs that are merged and therefore not included in the open stream count, and the third stream ID is a post-merge stream ID and is therefore included in the open stream count. In an example embodiment, the stream ID management module 153 may set a flag for indicating the first and second stream IDs. For example, the stream ID management module 153 may add a flag "1" corresponding to the first and second stream IDs to the mapping table. When a get stream status command is received from the host 20, status information of stream IDs that are open may be identified by referring to the flag and may be transmitted to the host 20.

In an example embodiment, the stream ID management module 153 may display the first and second stream IDs in lower case and the third stream ID in upper case. For example, the stream ID management module 153 may display the first and second stream IDs as STR_a and STR_b, respectively, and may display the third stream ID as STR_C. Also, the stream ID management module 153 may change the display of the external or internal stream ID in the mapping table by reflecting the display of the first and second stream IDs.

Also, the stream ID management module 153 may determine a post-merge internal stream ID in such a manner that an internal operation cost of the storage device 10 is minimized based on WAF, quality of service (QoS), throughput, etc. For example, the stream ID management module 153 may detect available spaces in blocks corresponding to stream IDs in the non-volatile memory 200 and determine, as a post internal stream ID, a stream ID corresponding to a block having a relatively large amount of available space. In other words, the stream ID management module 153 may detect a log area and a free area of the blocks respectively corresponding to the stream IDs in the non-volatile memory 200 and may determine, as a post-merge internal stream ID, a stream ID corresponding to a block having a relatively large free area.

The stream write handling module 155 may convert logical addresses provided by the host 20 into physical addresses appropriate for the non-volatile memory 200 in order to perform a write operation on the non-volatile memory 200. Thus, the stream write handling module 155 may generate a mapping table which maps the logical addresses and the physical addresses and may store the generated mapping table in the buffer 120.

Also, the stream write handling module 155 may manage data to be written to the non-volatile memory 200. For example, when the first and second stream IDs are merged into the third stream ID, the stream write handling module 155 may edit the mapping table which maps the logical addresses and the physical addresses with regard to the first and second stream IDs in such a manner that stream data regarding the first and second stream IDs is stored in a block corresponding to the third stream ID.

The background operation scheduling module 160 may control scheduling regarding a background operation such as garbage collection in the non-volatile memory 200. For example, when the first and second stream IDs are merged into the third stream ID, garbage collection may be performed on blocks corresponding to the first and second stream IDs.

Figure 10:
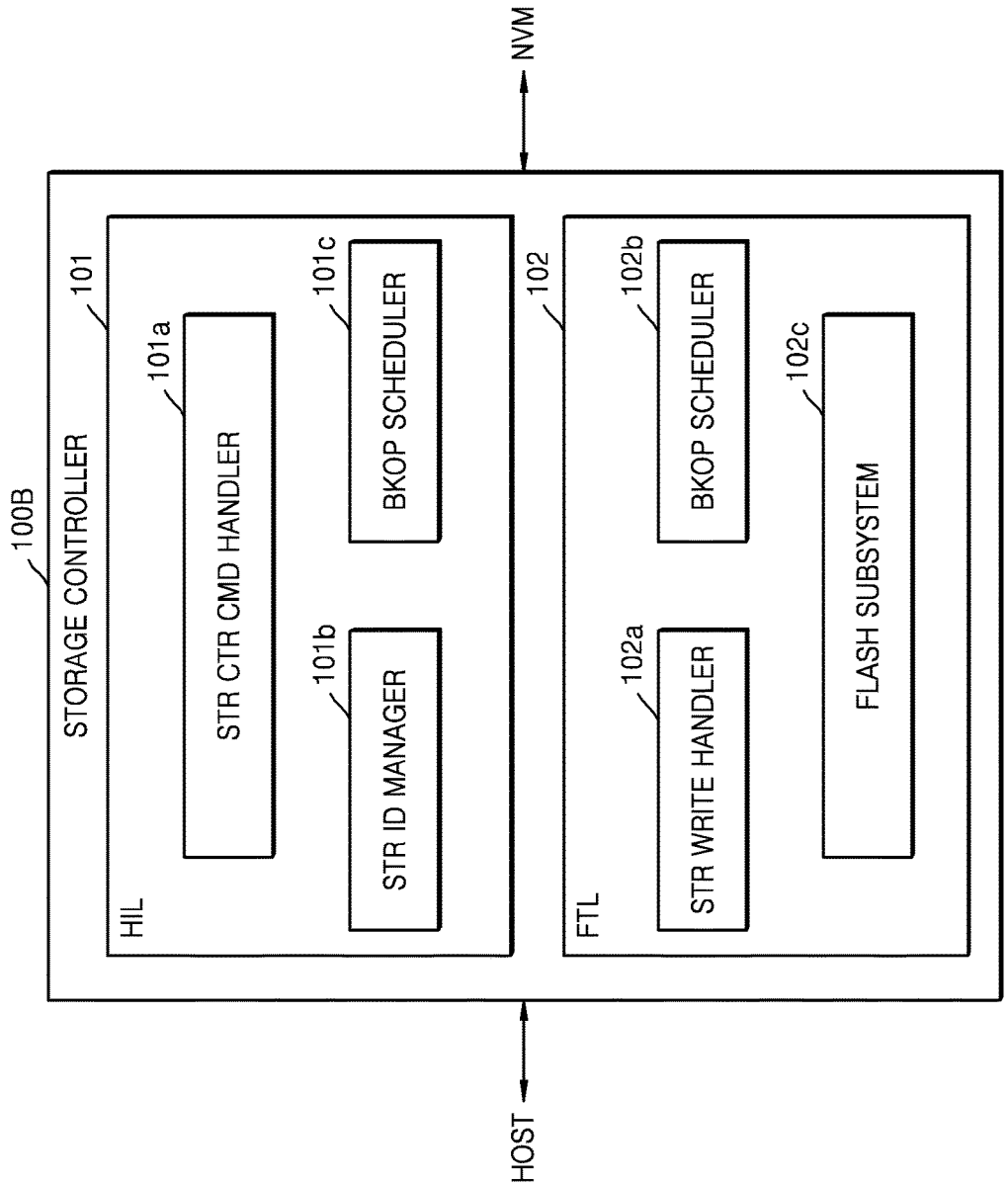
FIG. 10 is a block diagram illustrating an example of a storage controller included in the system of FIG. 1.

FIG. 10 is a block diagram illustrating an example of a storage controller 100B included in the system of FIG. 1.

Referring to FIGS. 9 and 10, the processor 110 of the storage controller 100B may execute software that provides a host interface layer (HIL) 101 and a flash translation layer (FTL) 102.

The illustrated example embodiment shows a software structure in which the command handling module 151, the stream ID management module 153, the string write handling module 155, and the background operation scheduling module 160 included in the storage controller 100A of FIG. 9 are embodied.

In detail, a stream control command handler 101a, a stream ID manager 101b, a stream write handler 102a, and background schedulers 101c and 102b may respectively correspond to the command handling module 151, the stream ID management module 153, the string write handling module 155, and the background operation scheduling module 160 of FIG. 9. Therefore, the descriptions provided with reference to FIG. 9 may be applied to the present example embodiment, and thus detailed descriptions of the stream control command handler 101a, the stream ID manager 101b, the stream write handler 102a, and the background schedulers 101c and 102b will be omitted.

In the present example embodiment, the stream control command handler 101a, the stream ID manager 101b, and the background scheduler 101c may be embodied in the HIL 101. The stream write handler 102a, the background scheduler 102b, and a flash sub-system 102c may be embodied in the FTL 102. The flash sub-system 102c may correspond to the memory interface 140. In an example embodiment, the storage controller 100B may include only one background scheduler, and in this case, the background scheduler may be embodied in the HIL 101 or the FTL 102.

FIG. 11 is a flowchart illustrating a method of operating a storage device according to an example embodiment.

Referring to FIG. 11, the method of operating the storage device according to the present example embodiment may include a method of performing a merge operation on at least two stream IDs in the storage device. The descriptions provided with reference to FIGS. 1 to 10 may be applied to the method of operating the storage device according to the present example embodiment.

In detail, the method of operating the storage device may include receiving, from a host, a stream control command controlling at least a first stream ID and a second stream ID, determining a third stream ID including control commands controlling the first and second stream IDs in response to the stream control command, and transmitting the third stream ID to the host. For example, the stream control command may be a stream ID merge command commanding the first stream ID and the second stream ID to be merged with each other and including the first and second stream IDs. For example, the third stream ID may be a post-merge stream ID in which the first and second stream IDs are merged.

Hereinafter, the method of operating the storage device will be described with reference to FIGS. 1 to 11.

In operation S110, the storage controller 100 associated with the storage device 10 may receive, from the host 20, a stream control command requesting merger of at least the first stream ID and the second stream ID. The stream control command may be referred to as a stream ID merge command. For example, the stream ID merge command may be presented as Merge (A, B) where A is a first stream ID and B is a second stream ID. In an example embodiment, the stream control command may be referred to as a stream management command.

In the present example embodiment, the stream ID merge command may request merger of at least two stream IDs, for example, the first stream ID and the second stream ID and output only one of the stream IDs as a single post-merge stream ID. In an example embodiment, the number of merged stream IDs may vary according to the stream ID merge command. In the present example embodiment, the stream ID merge command may not include information regarding which of the at least two stream IDs, that is, the first stream ID and the second stream ID, will be the post-merge stream ID.

In the present example embodiment, the first stream ID and the second stream ID, which are subject to be merged, are stream IDs that are open in advance before the stream control command is received. Accordingly, the stream control command may not include a command of opening the first stream ID and the second stream ID, and the storage controller 100 may not perform an operation of opening the first stream ID and the second stream ID.

The first stream ID and the second stream ID are examples, and according to one or more example embodiments, a stream control command merging at least three stream IDs may be received. Accordingly, when at least three stream IDs are input, all of the input IDs may be merged.

In operation S130, the storage controller 100 may determine a post-merge stream ID in response to the stream control command.

In an example embodiment, the storage controller 100 may select the first stream ID as the post-merge stream ID, and thus, the second stream ID may be merged into the first stream ID. In another example embodiment, the storage controller 100 may select the second stream ID as the post-merge stream ID, and thus, the first stream ID may be merged into the second stream ID. In another example embodiment, the storage controller 100 may select a third stream ID, which is closed or one of stream IDs that are already open, as the post-merge stream ID, and thus, the first and second stream IDs may be merged into the third stream ID.

In operation S150, the storage controller 100 transmits the post-merge stream ID to the host 20. In an example embodiment, the storage controller 100 generates stream control parameter data including the post-merge stream ID and may transmit the generated stream control parameter data to the host 20.

The host 20 may determine that an operation of merging the first and second stream IDs is completed based on the received stream control parameter data.

Figure 12:
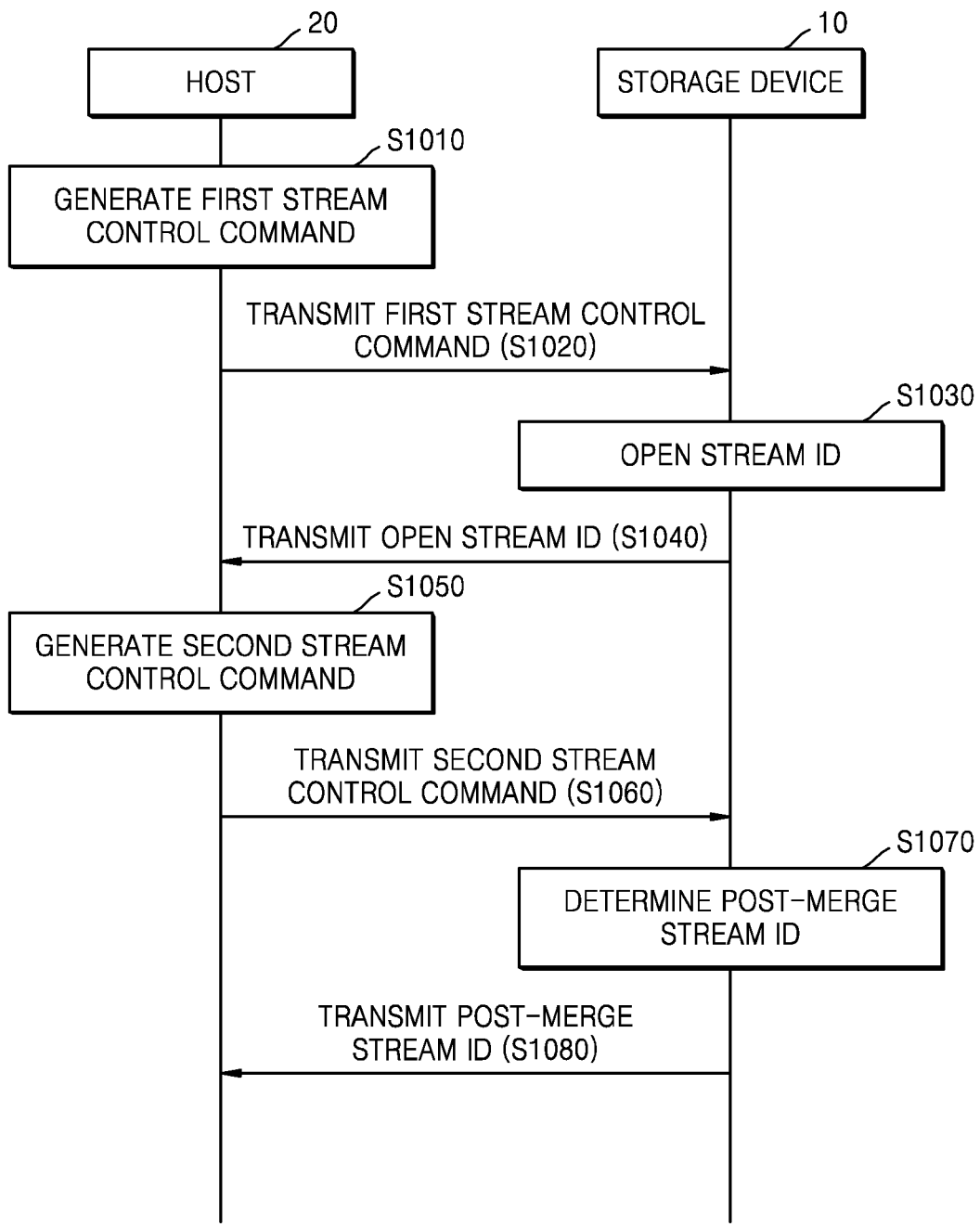
FIG. 12 is a flowchart illustrating an operation between a host and a storage device according to the method of FIG. 11.

FIG. 12 is a flowchart illustrating an operation between the host 20 and the storage device 10 according to the method of FIG. 11.

Referring to FIG. 12, operations may be sequentially performed between the host 20 and the storage device 10 in order to perform an operation of opening a stream ID and an operation of merging stream IDs. The descriptions provided with reference to FIGS. 1 to 11 may also be applied to the present example embodiment.

In operation S1010, the host 20 generates a first stream control command. The first stream control command may be a stream control command opening of a new stream ID. In this case, the first stream control command may be referred to as a stream ID open command.

In an example embodiment, the stream ID open command may command opening of a stream ID. In an example embodiment, the host 20 may sequentially generate stream ID open commands.

In operation S1020, the host 20 transmits the first stream control command to the storage device 10.

In operation S1030, the storage device 10 opens the stream ID in response to the first stream control command.

In the present example embodiment, the first stream control command may not include information regarding a stream ID that is subject to be open, and the storage device 10 may determine a stream ID subject to be open and may perform an operation of opening the determined stream ID. In other example embodiments, the first stream control command received from the host 20 may include information regarding a stream ID that is subject to be open, and the storage device 10 may perform an operation of opening the stream ID that is subject to be open.

In operation S1040, the storage device 10 may transmit the open stream ID to the host 20. In an example embodiment, the storage device 10 may generate stream control parameter data including the open stream ID and may transmit the generated stream control parameter data to the host 20. The host 20 may determine that the operation of opening the stream ID is completed based on the received stream control parameter data. However, operation S1040 is optional, and in some example embodiments, operation S1040 may be omitted. For example, when the host 20 includes information regarding a stream ID that is subject to be open in the first stream control command, the storage device 10 may omit operation S1040.

In operation S1050, the host 20 generates a second stream control command. The second stream control command may be a stream control command requesting merger of two stream IDs. In this case, the second stream control command may be referred to as a stream ID merge command. For example, the stream ID open command may be indicated as Merge (A, B), where A is a first stream ID, and B is a second stream ID.

In operation S1060, the host 20 may transmit the second stream control command to the storage device 10.

In operation S1070, the storage device 10 may select, as a post-merge stream ID, one of at least two stream IDs which are included in the second stream control command and are to be merged, in response to the second stream control command. One or more example embodiments regarding an operation of determining the post-merge stream ID will be described below with reference to FIGS. 13 to 17.

In operation S1070, the storage device 10 may transmit the post-merge stream ID to the host 20. In an example embodiment, the storage device 10 may generate stream control parameter data including the post-merge stream ID and may transmit the generated stream control parameter data to the host 20. The host 20 may determine that an operation of merging stream IDs is completed based on the received stream control parameter data.

Figure 13:
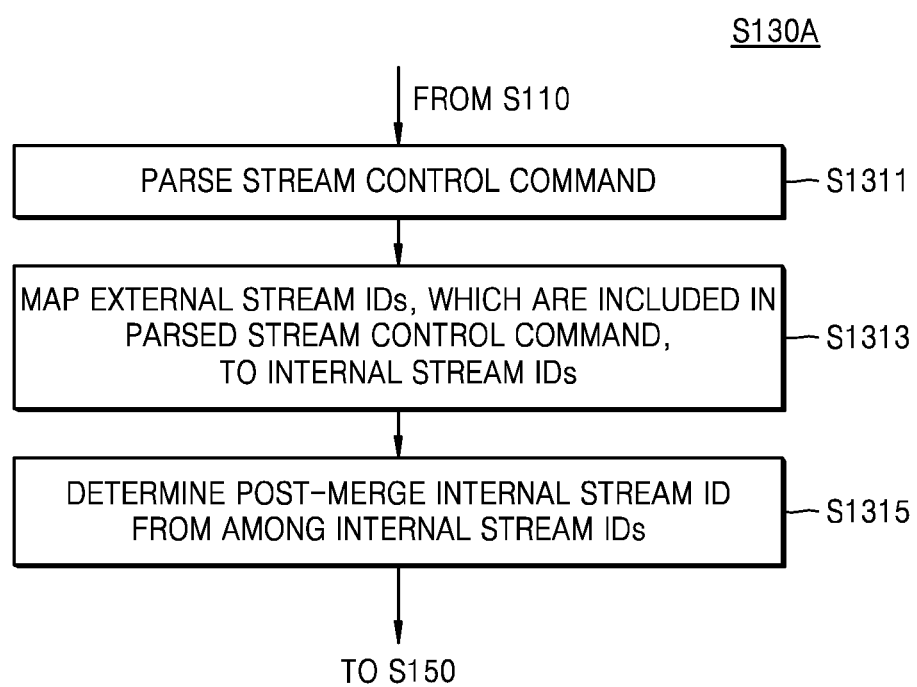
FIG. 13 is a flowchart illustrating an operation of determining a post-merge stream ID included in the method of FIG. 11.

FIG. 13 is a flowchart illustrating an operation of determining a post-merge stream ID included in the method of FIG. 11.

Referring to FIG. 13, in operation S1311, the storage controller 100 may parse a stream control command. In detail, the storage controller 100 may parse the stream control command when the received stream control command is input and may determine an operation commanded by the stream control command. Operation S1311 may be performed in the HIL 101 of the processor 110 associated with the storage controller 100, and in detail, may be performed by the stream command handler 101a.

In operation S1313, the storage controller 100 may map external stream IDs, which are included in the parsed stream control command, with internal stream IDs. Operation S1313 may be performed in the HIL 101 of the processor 110 associated with storage controller 100, and in detail, may be performed by the stream ID manager 101b.

The determined stream ID may be an external stream ID received/transmitted via a channel between the host 20 and the storage device 10. The storage controller 100 may map the external stream ID with an internal stream ID received/transmitted within the storage device 10 or may translate the external stream ID. The storage controller 100 may store a mapping table, in which mapping information between the external stream ID and the internal stream ID is stored, in the buffer 120.

In operation S1315, the storage controller 100 may determine a post-merge internal stream ID from among internal stream IDs. Operation S1315 may be performed in the HIL 101 of the processor 110 associated with the storage controller 100, and in detail, may be performed by the stream ID manager 101b.

The storage controller 100 may determine a post-merge internal stream ID to minimize an internal cost of the storage device 10 based on WAF, QoS, throughput, etc. For example, the storage controller 100 may detect spare spaces in blocks respectively corresponding to the stream IDs in the non-volatile memory 200 and may determine a stream ID corresponding to a block having a relatively large spare space as a post internal stream ID.

FIG. 14 illustrates a format of a stream control command according to an example embodiment.

Referring to FIG. 14, the stream control command may be provided from the host 20 to the storage device 10 and may be, for example, 16-bytes long. A format of the stream control command to be described hereinafter is merely an example, and in example embodiments, formats of the stream control command may vary.

Bit 0 to Bit 7 of a first byte Byte 0 may be operation code fields including operation code information. Bit 0 to Bit 4 of a second byte Byte 1 may be a service action field including service action information, and Bit 0 to Bit 7 of the second byte Byte 1 may be a stream control field including stream control information. Fifth and sixth bytes Byte 4 and Byte 5 may be stream ID fields including stream ID information.

The stream control field may indicate a stream operation, for example, a stream open operation, a stream close operation, a stream ID merge operation, or the like, which is to be performed. For example, when the stream control field indicates a stream open operation, a request for including an open stream ID in parameter data that is returned from the storage device 10 may be made. For example, when the stream control field indicates a stream close operation, the stream ID field may include a stream ID subject to be closed. For example, when the stream control field indicates a stream ID merge operation, the stream ID field may include a stream ID subject to be merged.

FIG. 15 illustrates a format of stream control parameter data according to an example embodiment.

Referring to FIG. 15, the stream control parameter data may be provided by the storage device 10 to the host 20 and may be provided, for example, in an 8-bytes long. A format of the stream control parameter data described hereinafter is merely an example of the present disclosure, and in an example embodiment, formats of the stream control parameter data may vary.

Bit 0 to Bit 7 of a first byte Byte 0 may be parameter length fields including length information of parameter data. Third and fourth bytes Byte 4 and Byte 5 may be assignment stream ID fields including assigned stream ID information. For example, when stream control fields of the stream control command indicates a stream open operation, the assignment stream ID fields of the stream control parameter data may include a stream ID that is newly open through an open operation. For example, when a stream control field of the stream control command indicates a stream ID merge operation, the assignment stream ID field of the stream control parameter data may include a post-merge stream ID that is determined through a stream ID merge operation.

Figure 16:
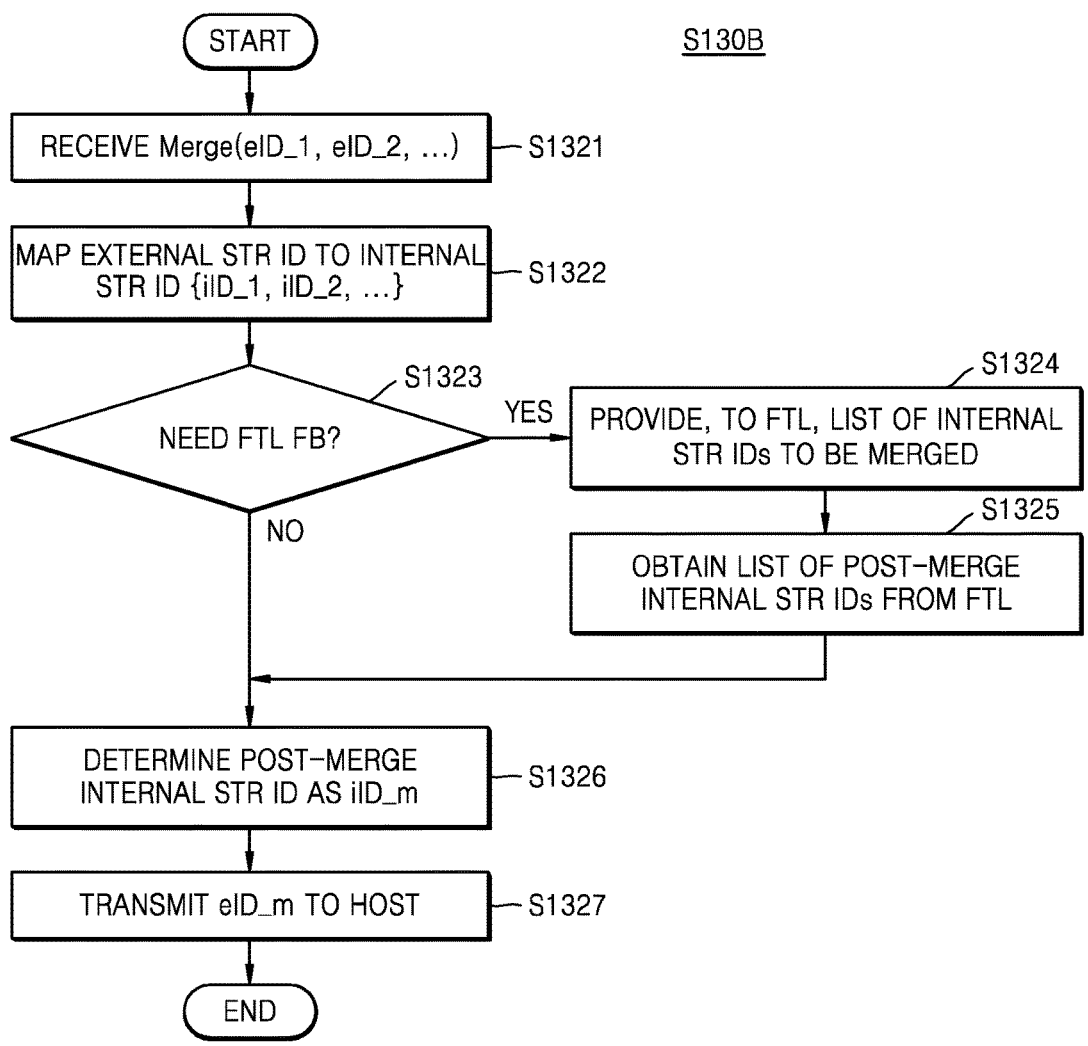
FIG. 16 is a flowchart illustrating an example of an operation of determining a post-merge stream ID included in the method of FIG. 11.

FIG. 16 is a flowchart illustrating an example of an operation of determining a post-merge stream ID included in the method of FIG. 11.

Referring to FIG. 16, the operation of determining the post-merge stream ID may be implemented in, for example, the HIL of the storage controller 100.

In operation S1321, the storage controller 100 may receive a stream control command controlling a stream ID merge operation. The stream control command may command an operation of merging stream IDs among stream IDs that are already open, and the operation may be presented as, for example, Merge (eID_1, eID_2). The eID_1 and eID_2 may be external IDs of the first and second streams, that is, eID_1 and eID_2, may be external stream IDs.

In operation S1322, the storage controller 100 may map the external stream IDs (i.e., eID_1, eID_2) with internal stream IDs (iID_1, iID_2). The external stream IDs are external IDs received/transmitted via a channel between the host 20 and the storage device 10, and the internal stream IDs are internal IDs received/transmitted within the storage device 10. The storage controller 100 may store a mapping table which maps the external stream ID and the internal stream ID in the buffer 120.

In operation S1323, the storage controller 100 may determine whether an FTL feedback is necessary. In detail, whether information necessary to determine a post-merge stream ID needs to be received from the FTL is determined. According to a determination result, operation S1324 is performed when the FTL feedback is necessary, and if not, operation S1326 is performed.

In operation S1324, the storage controller 100 may provide a list to the FTL of internal stream IDs to be merged through a merge operation. The internal stream IDs included in the list provided to the FTL are internal IDs corresponding to stream IDs included in the stream control command.

In operation S1325, the storage controller 100 may obtain a list from the FTL of post-merge internal stream IDs corresponding to post-merge internal stream ID candidates.

In operation S1326, the storage controller 100 may determine a post-merge internal stream ID from the list of the post-merge internal stream IDs.

In operation S1327, the storage controller 100 may transmit an external ID corresponding to the post-merge internal stream ID to the host 20 as a post-merge stream ID.

Figure 17:
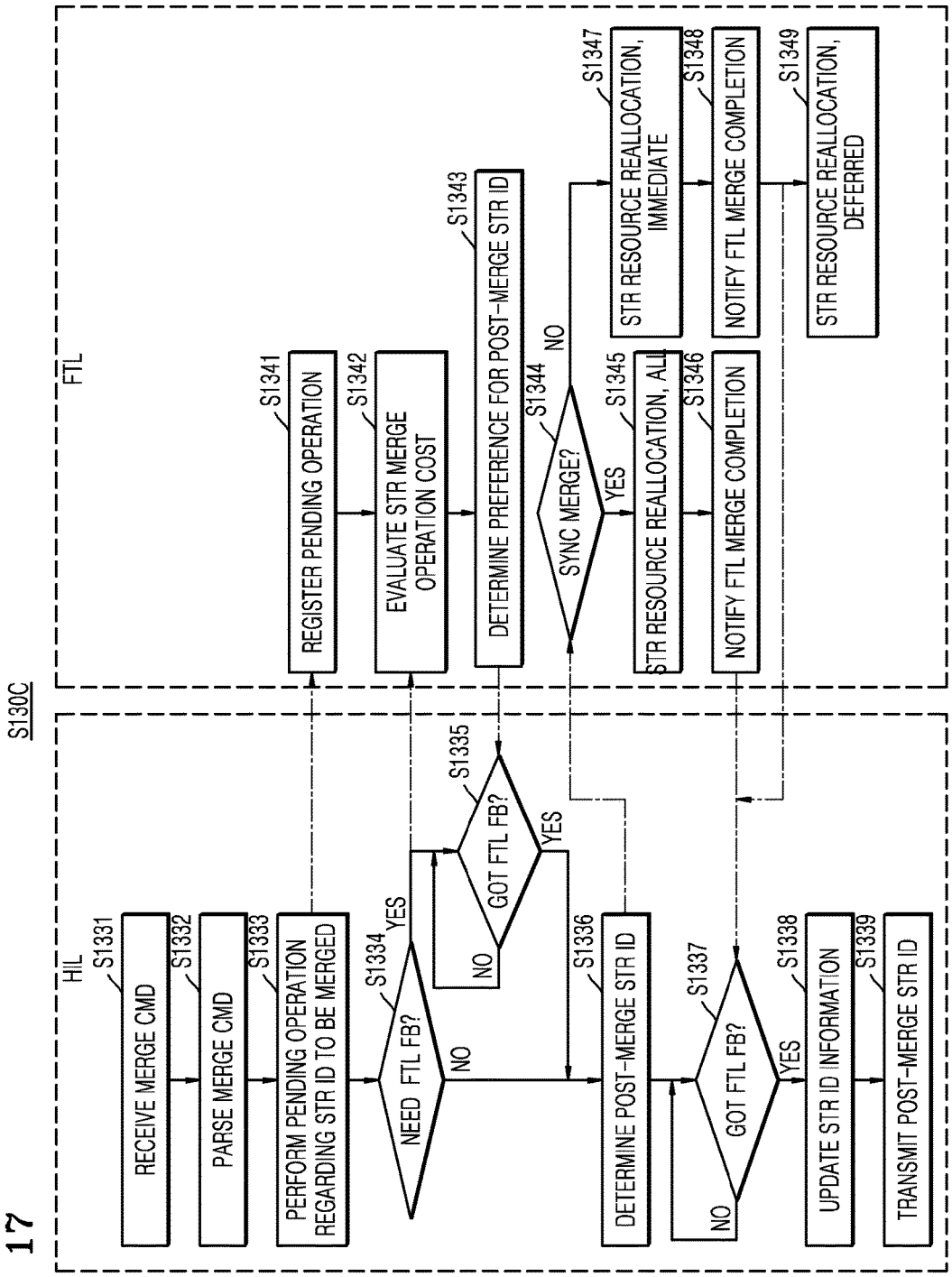
FIG. 17 is a detailed flowchart illustrating an operation of determining a post-merge stream ID of FIG. 16.

FIG. 17 is a detailed flowchart illustrating an operation of determining a post-merge stream ID of FIG. 16.

Referring to FIG. 17, the operation of determining the post-merge stream ID may be implemented in, for example, the HIL 101 and the FTL 102 of the storage controller 100.

Operations S1331 to S1339 may be performed in the HIL 101, and operations S1341 to S1349 may be performed in the FTL 102.

In operation S1331, the storage controller 100 may receive a stream control command the host 20. Operation 1332 may be the same as Operation 1322 of FIG. 16. In the present example embodiment, the stream control command may be a stream ID merge command and will be hereinafter referred to as a stream ID merge command.

In operation S1332, the storage controller 100 may parse a stream ID merge command.

In operation S1333, the storage controller 100 may perform pending operations on a stream ID to be merged.

In operation S1341, the pending operations are registered in the FTL 102. For example, the pending operations may be a read operation or write operation for the stream ID to be merged. The pending operation on the stream ID to be merged may be performed between the FTL 102 and the non-volatile memory 200 by registering the pending operation at the FTL 102.

In operation S1334, the storage controller 100 may determine whether the FTL feedback is necessary. Operation 1334 may be the same as Operation 1323 of FIG. 16.

According to a determination result, operation S1342 is performed when the FTL feedback is necessary, and if not, operation S1336 is performed.

In operation S1342, a cost regarding a stream ID merge operation is evaluated. For example, the cost regarding the stream ID merge operation is evaluated based on the WAF, QoS, throughput, etc.

In operation S1343, a preference for post-merge stream ID candidates is determined. In detail, the preference for post-merge stream ID candidates may be determined based on the WAF, QoS, throughput, etc. A feedback on the preference for post-merge stream ID candidates may be provided to the HIL 101.

In operation S1335, whether the FTL feedback has been received is determined, and when it is determined that the FTL feedback has been received, operation S1336 is performed.

In operation S1336, a post-merge stream ID is determined. Operation 1336 may be the same as Operation 1326 of FIG. 16.

Then, in operation S1344, whether to perform a sync merge is determined. In the present example embodiment, a resource assigned to stream IDs to be merged may be migrated to the post-merge stream ID, and in operation S1344, whether a migration operation is to be simultaneously performed with an operation of merging the stream IDs may be determined.

Operation S1345 and operation S1346 are operations according to a sync operation when the sync merge is determined to be performed. In operation S1345, stream resource reallocation is performed by migrating resources assigned to the stream IDs, which are to be merged, to the post-merge stream ID. For example, the FTL 102 may perform a flush operation in which pieces of data which correspond to the stream IDs to be merged and are stored in the buffer are written in a block corresponding to the post-merge stream ID in the non-volatile memory. In operation S1346, completion of the merge operation in the FTL is informed to the HIL.

Operations S1347 to S1349 are operations according to background operation scheduling when it is determined that no sync merge is to be performed. In operation S1347, stream resource reallocation may be performed by migrating, to the post-merge stream ID, some of the resources assigned to the stream IDs to be merged. The migrated resources are resources that are determined through instant resource reallocation that is performed during background operation scheduling. For example, the FTL may perform a flush operation in which pieces of data which are stored in the buffer and correspond to the stream IDs to be merged are written to a block corresponding to the post-merge stream ID in the non-volatile memory. In operation S1348, the HIL in the FTL is notified of the completion of the merge operation. In operation S1349, the stream resource reallocation is performed by migrating, to the post-merge stream ID, remaining resources assigned to the stream ID to be merged. The resources to be migrated are determined through the resource reallocation that is delayed due to the background operation scheduling.

In operation S1337, whether the FLT feedback has been received is determined, and when it is determined that the FTL feedback has been received, operation S1338 is performed. The FTL feedback may indicate whether the merge operation has completed in the FTL. In operation S1338, stream ID information is updated. The updated stream ID information may be stored in the buffer 120 included in the storage controller 100.

In operation S1339, the post-merge stream ID is transmitted to the host 20. Operation 1339 may be the same as Operation 1327 of FIG. 16. The host 20 may detect that the merge operation is completed based on the received post-merge stream ID.

Figure 18:
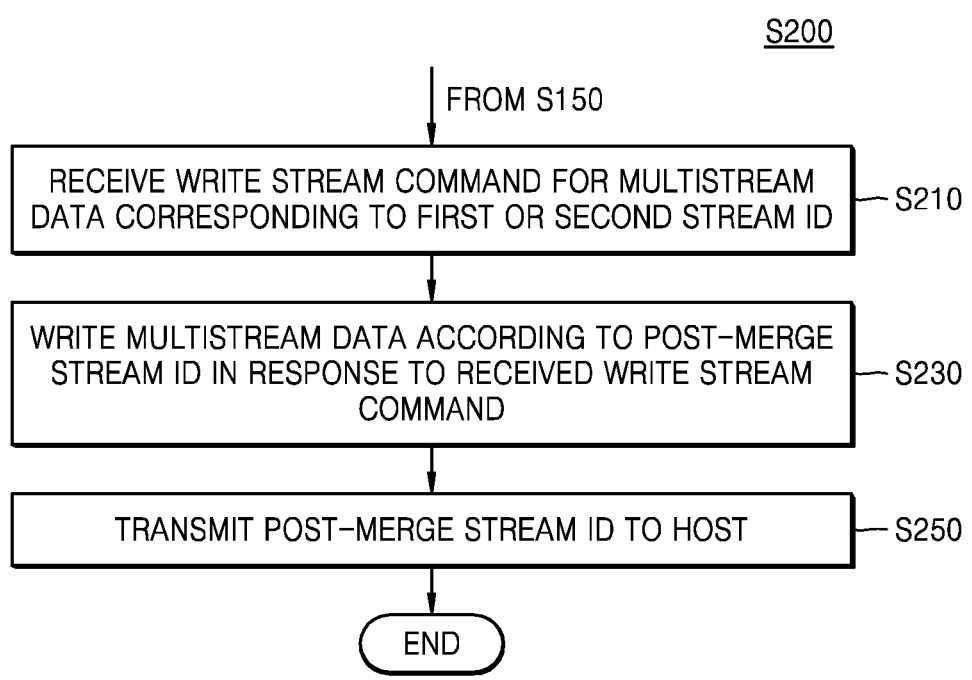
FIG. 18 is a flowchart illustrating a method of operating a storage device according to an example embodiment.

FIG. 18 is a flowchart illustrating a method of operating a storage device according to an example embodiment.

Referring to FIG. 18, the method of operating the storage device is a method of performing a stream write operation on multi-stream data and may be performed after operation S150 of FIG. 11. For example, the method of operating the storage device may be performed by the storage controller 100 after merging streams to create room for an additional stream. The descriptions provided with reference to FIGS. 1 to 17 may be applied to the present example embodiment.

In operation S210, the storage controller 100 may receive a write stream command regarding the multi-stream data corresponding to a first or second stream ID. The write stream command includes information regarding a stream ID that is subject to be written, and the storage device 10 may perform a write operation regarding the multi-stream data by referring to a stream ID included in the write stream command.

FIG. 19 illustrates a format of a write stream command according to an example embodiment.

Referring to FIG. 19, the write stream command is provided by the host 20 to the storage device 10 and may be provided, for example, in a 16-bytes long. The format of the write stream command described hereinafter is merely an example, and as another example, formats of the write stream command may vary.

Bit 0 to Bit 7 of a first byte Byte 0 may be operation code fields including operation code information. Bit 0 to Bit 7 of third to tenth bytes Byte 2 to Byte 9 may be logical block address (LBA) fields including LBA information. Bit 0 to Bit 7 of eleventh and twelfth bytes Byte 10 and Byte 11 may be stream ID fields including stream ID information. Thirteenth and fourteenth bytes Byte 12 and Byte 13 may be transmission length fields including transmission length information. For example, a transmission length may indicate the number of continuous logical blocks of data that is accessed.

Referring back to FIG. 18, in operation S230, the storage controller 100 may write multi-stream data according to the post-merge stream ID in response to the write stream command. In detail, the storage controller 100 may determine whether an external ID corresponding to a stream ID included in the write stream command is mapped to an internal ID included in a mapping table, by referring to the mapping table which maps the external ID and the internal ID.

If it is determined that the external ID corresponding to a stream ID included in the write stream command is mapped to the internal ID included in the mapping table, the storage controller 100 may merge and write the multi-stream data into the post-merge stream ID. In other words, when the first or second stream ID is mapped to the internal ID included in the mapping table, the multi-stream data may be merged into the post-merge stream ID and may be written. When the external ID corresponding to a stream ID included in the write stream command is not mapped to the internal ID included in the mapping table, a write operation may not be performed on the multi-stream data.

In some example embodiments, when the post-merge stream ID is the first stream ID, multi-stream data corresponding to the second stream ID is merged into the first stream ID and may be written to a block corresponding to the first stream ID in the non-volatile memory. In other example embodiments, when the post-merge stream ID is the second stream ID, the multi-stream data corresponding to the first stream ID is merged into the second stream ID and may be written to a block corresponding to the second stream ID in the non-volatile memory. In other example embodiments, when the post-merge stream ID is the third stream ID, pieces of the multi-stream data corresponding to the first and second stream IDs are merged into the third stream ID and may be written to a block corresponding to the third stream ID in the non-volatile memory.

In operation S250, the storage controller 100 may transmit the post-merge stream ID to the host 20. In detail, the storage controller 100 may generate parameter data including the post-merge stream ID in which the multi-stream data corresponding to the first or second stream ID is merged and written. The host 20 may detect that the first or second stream ID is written to another stream ID, that is, the post-merge stream ID, based on the received parameter data.

Figure 20:
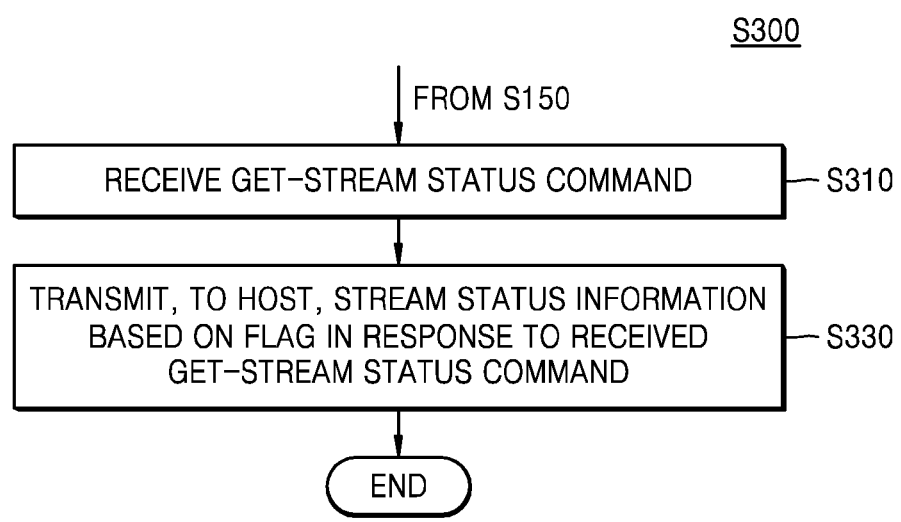
FIG. 20 is a flowchart illustrating a method of operating a storage device according to an example embodiment.

FIG. 20 is a flowchart illustrating a method of operating a storage device according to an example embodiment.

Referring to FIG. 20, the method of operating the storage device is a method of performing an operation of transmitting states of streams to the host 20 from the storage device 10 and may be performed after operation S150 of FIG. 11. For example, the method of operating the storage device according to the present example embodiment may be performed by the storage controller 100. The descriptions provided with reference to FIGS. 1 to 17 may be applied to the present example embodiment.

In operation S310, a get stream status command is received. The get stream status command may be a command of checking the status of a stream ID and determining whether the stream ID is open, closed, or merged. The get stream status command may be referred to as a get multistream log command.

FIG. 21 illustrates a format of a get stream status command according to another example embodiment.

Referring to FIG. 21, the get stream status command may be provided from the host 20 to the storage device 10 and may be provided, for example, in a 16-bytes long. The format of the get stream status command is merely an example, and as another example, formats of the get stream status command may vary.

Bit 0 to Bit 7 of a first byte Byte 0 may be operation code fields including operation code information. Bit 0 to Bit 4 of a second byte Byte 1 may be a service action field including service action information. Fifth to sixth bytes Byte 4 and Byte 5 may be start stream ID fields including start stream ID information. Eleventh and thirteenth bytes Byte 10 and Byte 13 may be allocation length fields including allocation length information. An allocation length may limit the length of data transmitted to the host from the storage device, in response to the get storage status command.

Referring back to FIG. 20, in operation S330, the storage controller 100 may transmit stream status information based on a flag to the host 20 in response to the get stream status command. In detail, the storage controller 100 may generate get stream status parameter data including stream status information and may transmit the generated get stream status parameter data to the host 20.

According to the present example embodiment, the storage controller 100 may update open stream IDs in such a manner that a stream ID that is merged and does not affect an open stream count is distinguished form other stream IDs. In an example embodiment, the storage controller 100 may set a flag for indicating a merged stream ID. The storage controller 100 may determine merged stream IDs based on the flag, in response to the get stream status command. In an example embodiment, a storage controller 100 may display the post-merge stream ID to be distinguished from the merged stream ID and may store the same. For example, a stream ID that is merged and does not affect the open stream count is presented in lower case, and a stream ID that affects the open stream count may be presented in upper case.

FIG. 22 illustrates a format of get stream status parameter data according to an example embodiment.

Referring to FIG. 22, the get stream status parameter data may be provided from the storage device 10 to the host 20 and may include, for example, an 8-byte header. The format of the get stream status parameter data described hereinafter is merely an example, and as another example, formats of the get stream status parameter data may vary.

Bit 0 to Bit 7 of first to fourth bytes Byte 0 to Byte 3 may be stream list length fields including stream list length information. The stream list length may be a length of a stream list in a byte unit. Bit 0 to Bit 7 of seventh and eighth bytes Byte 6 and Byte 7 may be open stream number fields including open stream number information.

The get stream status parameter data may further include at least one stream status descriptor. The number of stream status descriptors may be determined according to the number of open streams. The stream status descriptor may include stream status information regarding one open stream and, in detail, may include a stream ID of an open stream.

Figure 23:
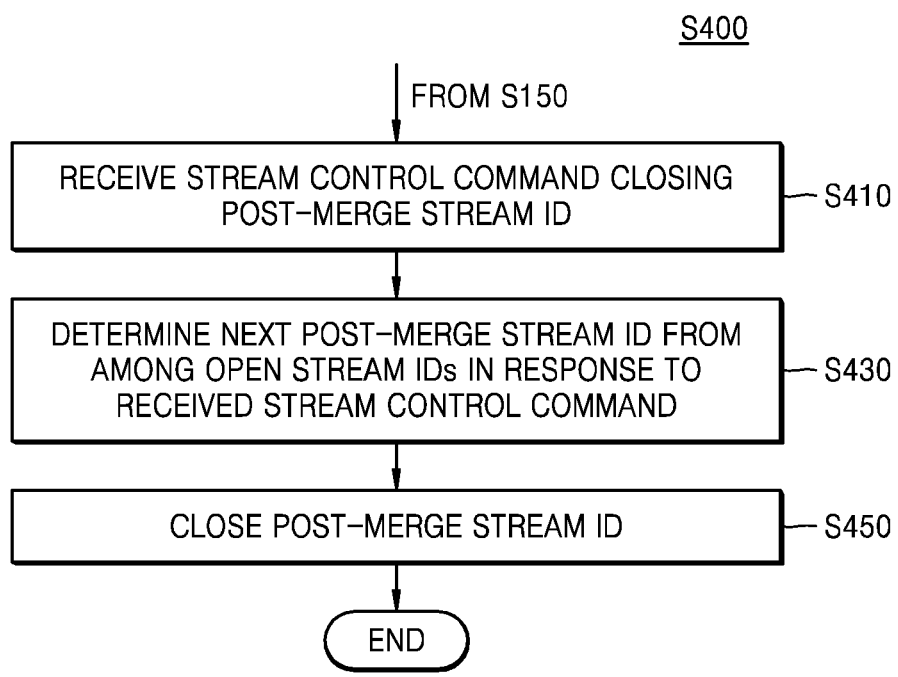
FIG. 23 is a flowchart illustrating a method of operating a storage device according to an example embodiment.

FIG. 23 is a flowchart illustrating a method of operating a storage device according to an example embodiment.

Referring to FIG. 23, the method of operating the storage device is a method of performing a stream close operation and may be performed after operation S150 of FIG. 11. For example, the method of operating the storage device may be performed by the storage controller 100. The descriptions provided with reference to FIGS. 1 to 17 may be applied to the present example embodiment.

In operation S410, the storage controller 100 may receive a stream control command closing a post-merge stream ID. The stream control command may be referred to as a stream close command and may include a stream ID that is subject to be closed.

In operation S430, in response to the stream control command, the storage controller 100 may determine a next post-merge stream ID from among open stream IDs. In detail, when a first stream ID and a second stream ID are merged into a third stream ID that is the post-merge stream ID, if the third stream ID is closed, the first and second stream IDs need to be merged into a stream ID different from the third stream ID. Therefore, before the post-merge stream ID is closed, the storage controller 100 has to determine a next post-merge stream ID into which the first and second stream IDs are to be merged.

In operation S450, the storage controller 100 closes the post-merge stream ID.

Figure 24:
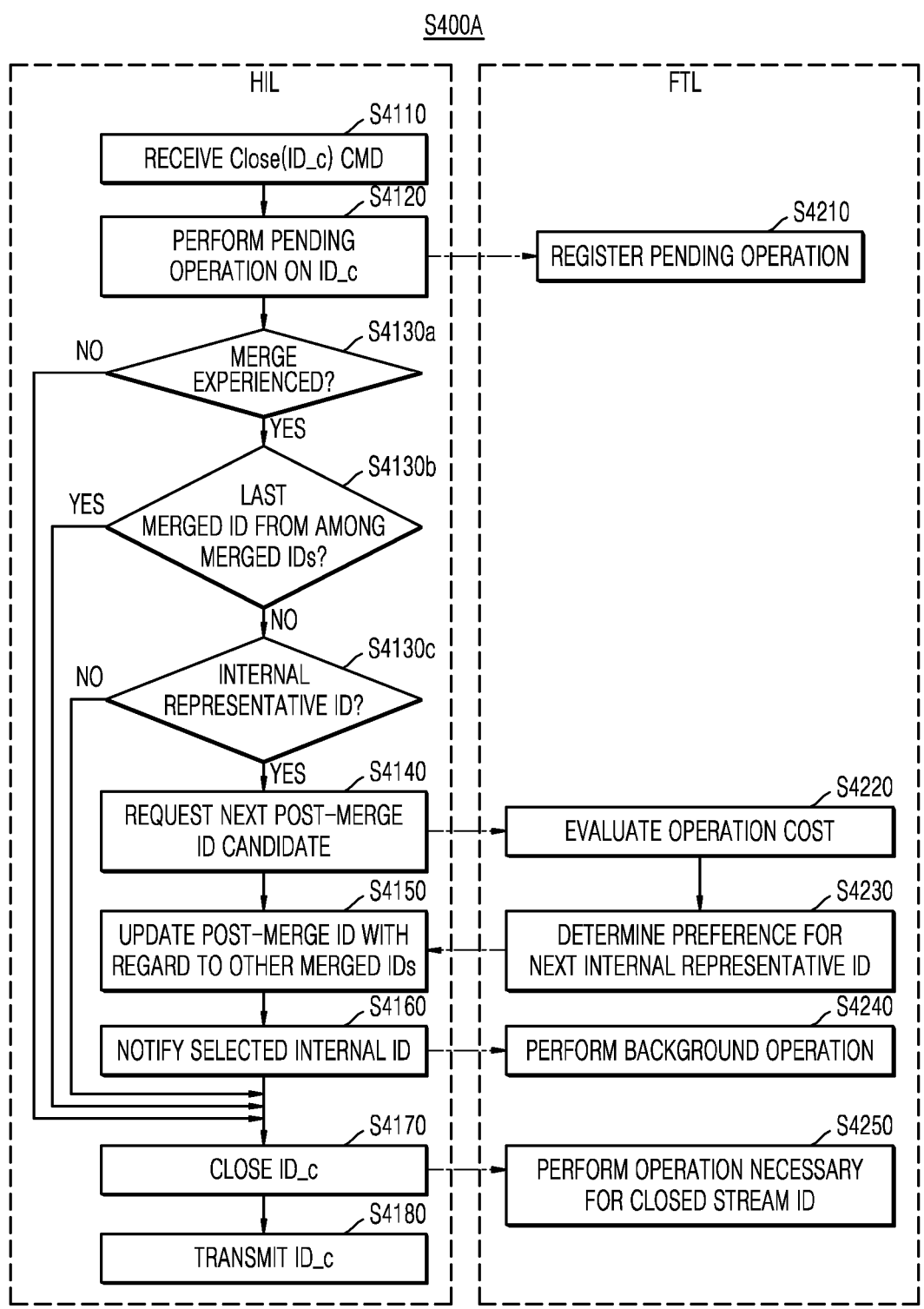
FIG. 24 is a detailed flowchart illustrating a method of operating a storage device of FIG. 23.

FIG. 24 is a detailed flowchart illustrating a method of operating a storage device of FIG. 23.

Referring to FIG. 24, a stream close operation may be implemented in, for example, the HIL 101 and the FTL 102 of the storage controller 100. Operations S4110 to S4180 may be performed by the processor 100 in the HIL 101, and operations S4210 to S4250 may be performed by the processor 100 in in the FTL 102.

In operation S4110, the stream control command is received from the host. In the present example embodiment, the stream control command may be a stream close command and may be hereinafter referred to as a stream close command. The stream close command may include a stream ID (e.g., the ID_c) that is subject to be closed.

In operation S4120, pending operations are performed on the stream ID (ID_c) that is subject to be closed. In operation S4210, the pending operations are registered to the FTL. For example, the pending operations may be read operations or write operations for the stream ID (ID_c) that is subject to be closed. The pending operations for the stream ID (ID_c) that is subject to be closed may be performed between the FTL and the non-volatile memory 200 by registering the pending operations to the FTL.

In operation S4130a, whether the stream ID (ID_c) that is subject to be closed has been merged is determined. After the determination, if the stream ID (ID_c) has been merged, operation S4130b is performed, and if not, operation S4170 is performed. In operation S4130b, it is determined whether the stream ID (ID_c) that is subject to be closed is a stream ID that is to be closed last from among the merged stream IDs. In other words, whether all other stream IDs are already closed from among merged IDs is determined. If it is determined that all stream IDs except for the stream ID (ID_c) are already closed, then operation S4170 is performed, in which the stream ID (ID_c) is closed. If it is determined that determined that stream IDs other than the stream ID (ID_c) are still open, operation S4130c is performed.

In operation S4130c, whether the stream ID (ID_c) that is subject to be closed is a representative ID is determined. For example, an internal representative ID may correspond to a post-merge stream ID. As an example, when the post-merge stream ID is already closed, the internal representative ID may correspond to a stream ID merged into the post-merge stream ID. If it is determined that the stream ID (ID_c) that is subject to be closed is the internal representative ID, operation S4140 is performed, and if not, operation S4170 is performed.

In operation S4130, the HIL requests for the FTL to determine a next post-merge stream ID candidate. In operation S4140, the FTL evaluates an operation cost. For example, the operation cost regarding next internal representative IDs are evaluated based on the WAF, QoS, throughput, etc. In operation S4230, the FTL determines a preference for the next internal representative IDs. In detail, the preference for the next internal representative IDs may be determined based on the WAF, QoS, throughput, etc.

In operation S4150, the HIL updates internal representative IDs corresponding to stream IDs other than the stream ID that is subject to be closed from among merged IDs. In operation S4160, the FTL is notified of a selected internal ID. In operation S4240, a background operation is performed. In operation S4170, the stream ID that is subject to be closed is closed. In operation S4250, an operation necessary for the closed stream ID is performed. In operation S4180, the closed stream ID is transmitted to the host.

Figure 25:
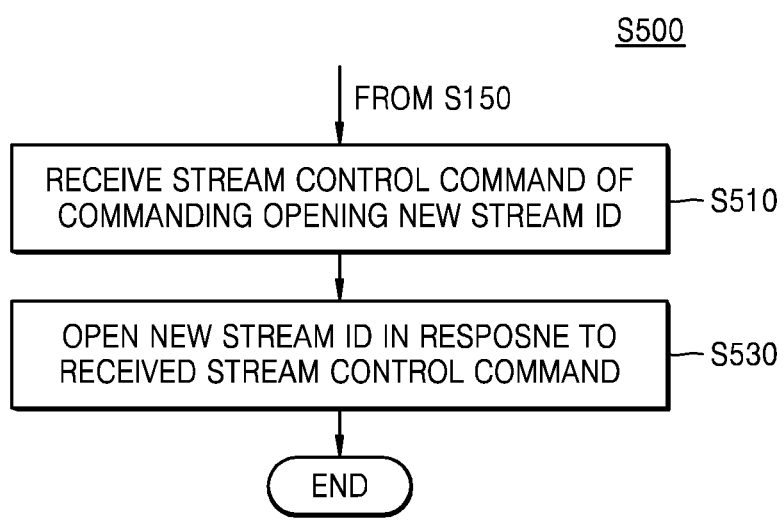
FIG. 25 is a flowchart illustrating a method of operating a storage device according to an example embodiment.

FIG. 25 is a flowchart illustrating a method of operating a storage device according to an example embodiment.

Referring to FIG. 25, the method of operating the storage device according to the present example embodiment is a method of performing an open operation for a new stream and may be performed after operation S150 of FIG. 11. The descriptions provided with reference to FIGS. 1 to 17 may be applied to the present example embodiment.

In operation S510, the storage controller 100 may receive a stream control command opening a new stream ID. The stream control command may be referred to as a stream open command. The stream open command may not include a stream ID.

In operation S530, the storage controller 100 may open the new stream ID in response to the stream control command. In detail, the storage controller 100 may perform a new stream ID open operation when an open stream count is smaller than a maximum value. The storage controller 100 may not perform the new stream ID open operation when the open stream count is equal to the maximum value and may transmit a stream open failure result to the host 20.

FIG. 26 is a flowchart illustrating a method of operating a storage device according to an example embodiment.

Referring to FIG. 26, the method of operating the storage device according to the present example embodiment is a method of performing a merge operation for stream IDs in the storage device and is a modified example embodiment of FIG. 11. The descriptions provided with reference to FIGS. 1 to 25 may be applied to the present example embodiment.

In particular, the method of operating the storage device according to the present example embodiment may include: receiving, from the host, a stream control command merging stream IDs into a target stream ID; merging the stream IDs into the target ID in response to the stream control command; receiving, from the host, a write stream command for stream data corresponding at least one of the stream IDs; and writing the stream data according to the target stream ID in response to the write stream command. In this case, n is an integer greater than 2.

Hereinafter, the method of operating the storage device will be described with reference to FIG. 26.

In operation S610, the storage controller 100 may receive a stream control command merging second to nth stream IDs into a first stream ID. In the present example embodiment, the storage controller 100 may receive the stream control command merging stream IDs from the host 20. In this case, the stream control command may be referred to as a stream ID merge command. In the present example embodiment, the host 20 may select the first stream ID as a post-merge stream ID. Accordingly, the stream control command may include stream IDs to be merged (e.g., the second to nth stream IDs) and the post-merge stream ID (e.g., the first stream ID). For example, the stream ID merge command may be displayed as Merge (A, B1, B2, . . . , B_n).

In operation S630, the storage controller 100 may perform a stream ID merge operation merging the second to nth stream IDs into the first stream ID in response to the stream control command.

In an example embodiment, the first stream ID may be an ID that is input first. However, example embodiments of the inventive concepts are not limited thereto, and in an example embodiment, the first stream ID is not limited to the ID that is input first and may be any one of the stream IDs. Likewise, in an example embodiment, the second to nth stream IDs may be the second to nth stream IDs that are input. However, the inventive concept is not limited thereto, and in an example embodiment, the second to nth stream IDs may be stream IDs other than the first stream ID.

In operation S650, the storage controller 100 may receive a write stream command regarding multi-stream data corresponding to one of the second to nth stream IDs. The write stream command includes information regarding the stream ID subject to be written.

In operation S670, in response to the write stream command, the storage controller 100 writes the multi-stream data according to the first stream ID. In detail, the storage controller 100 may determine whether an external ID corresponding to the stream ID included in the write stream command is mapped to an internal ID included in a mapping table by referring to the mapping table which maps the external ID and the internal ID.

After the determination, when the external ID corresponding to the stream ID included in the write stream command is mapped to the internal ID included in the mapping table, the multi-stream data is merged into the first stream ID that is the post-merge stream ID and may be written. When the external ID corresponding to the stream ID included in the write stream command is not mapped to the internal ID included in the mapping table, an operation of writing the multi-stream data may not be performed.

Figure 27:
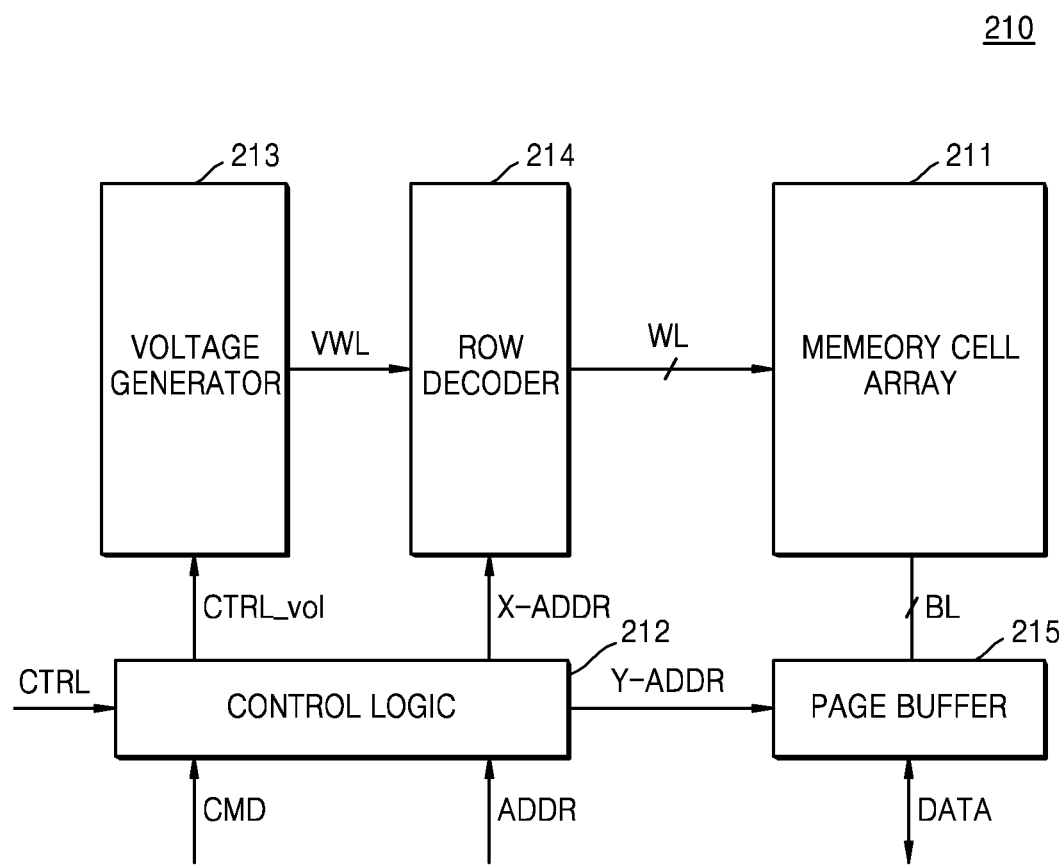
FIG. 27 illustrates a detailed block diagram of a non-volatile memory device included in the system of FIG. 1.

FIG. 27 illustrates a detailed block diagram of a non-volatile memory device 210 included in the system of FIG. 1.

Referring to FIG. 27, the non-volatile memory device 210 may include a memory cell array 211, control logic 212, a voltage generator 213, a row decoder 214, and a page buffer 215.

The memory cell array 211 may include memory cells, and each memory cell may be connected between a word line and a bit line. In an example embodiment, each memory cell may be a single-level cell storing 1-bit data. In an example embodiment, each memory cell may be a multi-level cell storing 2-bit data. In an example embodiment, each memory cell may be a triple-level cell storing 3-bit data. However, example embodiments of the inventive concepts are not limited thereto, and in an example embodiment, the memory cell array 211 may include memory cells respectively storing data of 4-bits or more. Also, the memory cell array 211 may include a single-level cell and a multi-level cell or a triple-level cell.

The control logic 212 may write data DATA to the memory cell array 211 or may output various control signals for reading the data DATA from the memory cell array 211 based on a command CMD, an address ADDR, a control signal CTRL received from the storage controller 100. In detail, the control logic 212 may provide a voltage control signal CTRL_vol to the voltage generator 213, may provide a row address X_ADDR to the row decoder 214, and may provide a column address Y_ADDR to the page buffer 215.

The voltage generator 213 may generate voltages for performing write, read, and erase operations on the memory cell array 211 based on the voltage control signal CTRL_vol. The row decoder 214 is connected to the memory cell array 211 through word lines WL and may activate a word line selected from among the word lines WL in response to the row address X_ADDR received from the control logic 212.

The page buffer 215 may be connected to a bit line selected from among bit lines BL in response to the row address X_ADDR received from the control logic 212. When a write operation is performed, the page buffer 215 may operate as a write driver, and when a read operation is performed, the page buffer 215 may operate as a sense amplifier.

Figure 28:
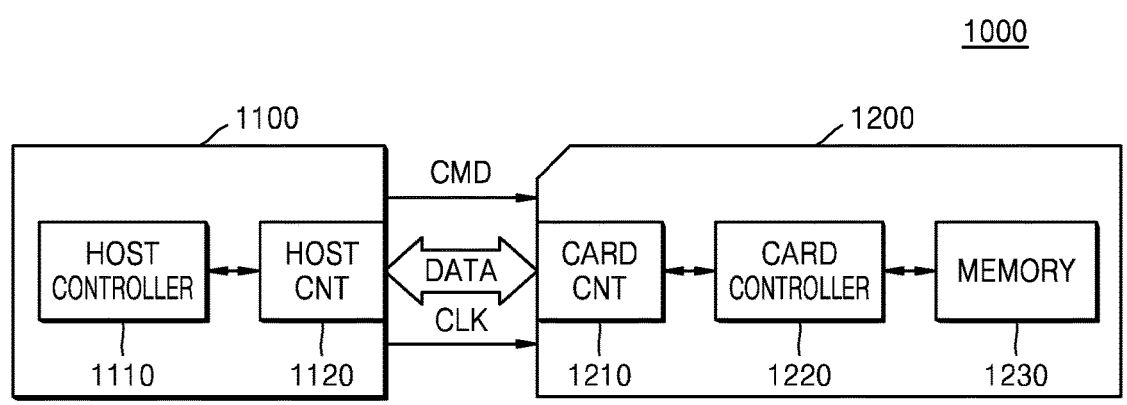
FIG. 28 is a block diagram illustrating an example in which storage devices according to one or more example embodiments are applied to a memory card system.

FIG. 28 is a block diagram illustrating an example in which storage devices according to one or more example embodiments are applied to a memory card system 1000.

Referring to FIG. 28, the memory card system 1000 may include a host 1100 and a memory card 1200. The host may include a host controller 1110 and a host connection unit 1120. The memory card 1200 may include a card connection unit 1210, a card controller 1220, and a memory device 1220. In this case, the memory card 1200 may be embodied based on the example embodiments of FIGS. 1 to 27.

The host 1100 may write data to the memory card 1200 or may read data stored in the memory card 1200. The host controller 1110 may transmit a command CMD, a clock signal CLK generated by a clock generator (not shown) included in the host 1100, and data DATA, to the memory card 1200 via the host connection unit 1120.

The card controller 1220 may store data in the memory device 1220 in synchronization with a clock signal generated by a clock generator (not shown) within the card controller 1220, in response to a command received via the card connection unit 1210. The memory device 1220 may store data transmitted from the host 1100.

The memory card 1200 may be embodied as a compact flash card (CFC), a microdrive, a smart media card (SMC), a multimedia card (MMC), a security digital card (SDC), a memory stick, a universal serial bus (USB) memory driver, or the like.

Figure 29:
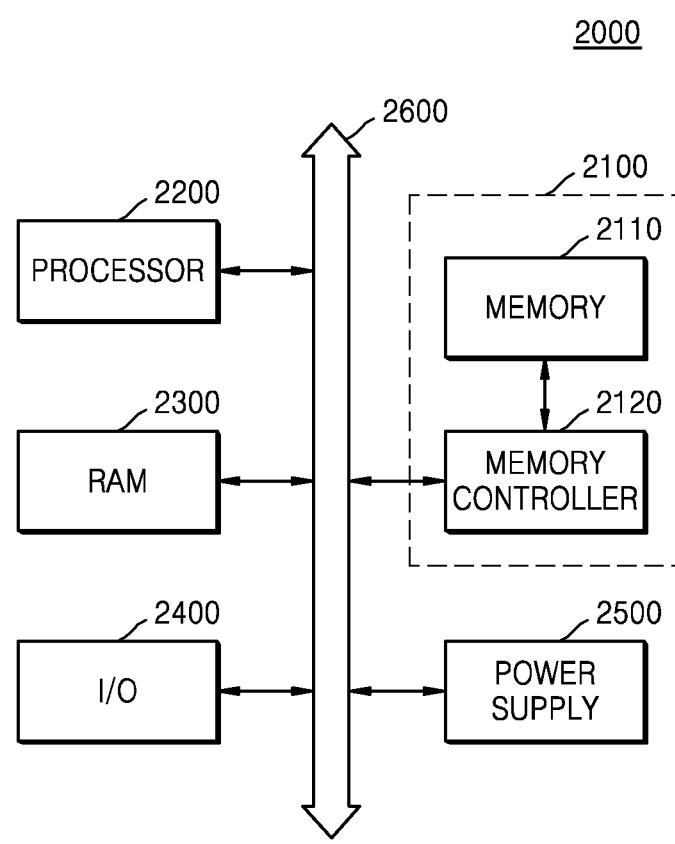
FIG. 29 is a block diagram illustrating a computing system including storage devices according to one or more example embodiments.

FIG. 29 is a block diagram illustrating a computing system 2000 including storage devices according to one or more example embodiments.

Referring to FIG. 29, the computing system 2000 may include a memory system 2100, a processor 2200, RAM 2300, an input/output (I/O) device 2400, and a power supply 2500. Although not illustrated in FIG. 29, the computing system 2000 may further include ports that may communicate with a video card, a sound card, a memory card, a USB device, etc. or with other electronic devices. The computing system 2000 may be embodied as a portable electronic device such as a PC, a laptop computer, a mobile phone, a PDA, or a camera.

The processor 2200 may perform certain calculations or tasks. According to example embodiments, the processor 2200 may be a micro-processor or a central processing unit (CPU). The processor 2200 may communicate with the RAM 2300, the I/O device 2400, and the memory system 2100 via a bus 2600 such as an address bus, a control bus, and a data bus. In this case, the memory system 2100 may be embodied based on the example embodiments of FIGS. 1 to 28. According to example embodiments, the processor 2200 may be connected to an expansion bus such as a Peripheral Component Interconnect (PCI) bus.

The RAM 2300 may store data needed in operating the computing system 2000. For example, the RAM 2300 may be embodied as a DRAM, a mobile DRAM, an SRAM, a PRAM, an FRAM, an RRAM, and/or an MRAM. The I/O device 2400 may include an input unit such as a keyboard, a keypad, or a mouse and an output unit such as a printer or a display. The power supply 2500 may supply an operating voltage needed in operating the computing system 2000.

Figure 30:
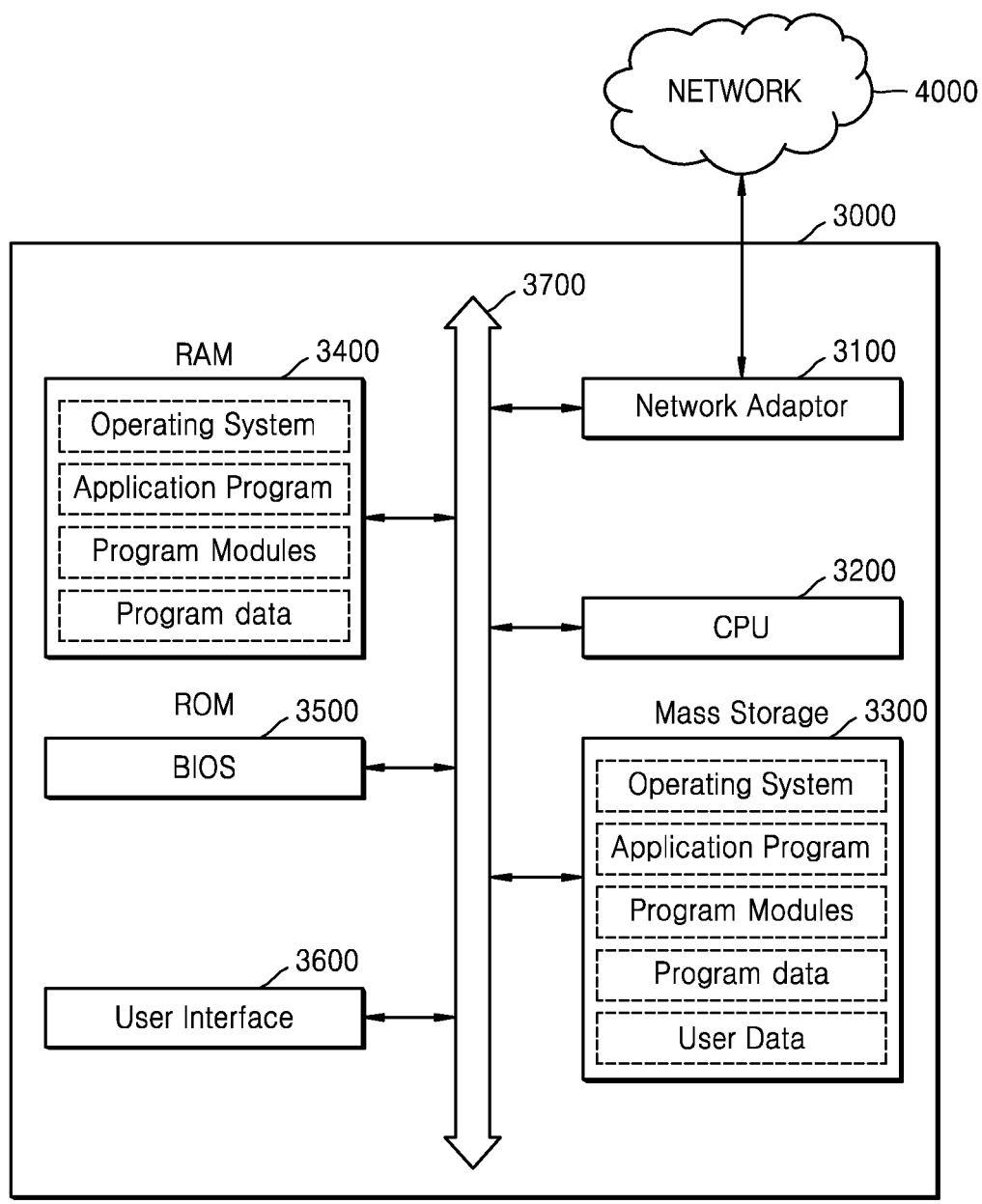
FIG. 30 is a block diagram illustrating an example of a computing system including storage devices according to one or more example embodiments.

FIG. 30 is a block diagram illustrating an example of a computing system 3000 including storage devices according to one or more example embodiments.

Referring to FIG. 30, the computing system 3000 is a computing system including a mass storage device according to one or more example embodiments. The computing system 3000 may include a network adaptor 3100, a CPU 3200, a mass storage device 3300, RAM 3400, ROM 3500, and a user interface 3600 that are respectively connected to a system bus 3700.

The network adaptor 3100 provides interfacing between the computing system 3000 and external networks 4000. The CPU 3200 performs all operations for operating an OS or application programs installed in the RAM 3400. The mass storage device 3300 stores data needed in the computing system 3000. For example, the mass storage device 3300 may store an OS for operating the computing system 3000, an application program, various program modules, program data, user data, and the like.

The RAM 3400 may be used as a working memory of the computing system 3000. During booting, the OS read from the mass storage device 3300, the application program, the program modules, and program data used to execute programs are loaded on the RAM 3400. A basic input/output system (BIOS) that is a basic I/O system activated before an OS operates during booting is stored in the ROM 3500. Information is exchanged between the computing system 3000 and the user via the user interface 3600. The computing system 3000 may further include a battery, a modem, or the like. Also, although not illustrated, it would have been obvious to one of ordinary skill in the art that the computing system 3000 may further include a camera image processor (CIS), a mobile DRAM, or the like.

As described above, the mass storage device 3300 may include an SSD, an MMC card, an SD card, a micro SD card, a memory stick card, an ID card, a PCMCIA card, a chip card, a USB card, a smart card, a compact flash (CF) card, or the like.

A memory card, a non-volatile memory device, and a card controller according to one or more example embodiments may be mounted by using various types of packages. For example, a flash memory device and/or a memory controller according to one or more example embodiments may be mounted by using packages such as a Package on Package (PoP), Ball grid arrays (BGAs), Chip scale packages (CSPs), a Plastic Leaded Chip Carrier (PLCC), a Plastic Dual In-Line Package (PDIP), a Die in Waffle Pack, a Die in Wafer Form, a Chip On Board (COB), a Ceramic Dual In-Line Package (CERDIP), a Plastic Metric Quad Flat Pack (MQFP), a Thin Quad Flatpack (TQFP), a Small Outline (SOIC), a Shrink Small Outline Package (SSOP), a Thin Small Outline (TSOP), a System In Package (SIP), a Multi Chip Package (MCP), a Wafer-level Fabricated Package (WFP), or a Wafer-Level Processed Stack Package (WSP).

While example embodiments of the inventive concepts have been particularly shown and described with reference to example embodiments thereof, it will be understood that various changes in form and details may be made therein without departing from the spirit and scope of the following claims.

What is claimed is:

1. A method of operating a storage device that controls input/output of multi-stream data according to a stream ID, the method comprising:
   receiving, from a host, a first stream control command associated with at least a first stream ID and a second stream ID;
   determining, in response to the first stream control command, a third stream ID, the third stream ID including control commands for the first and second stream IDs;
   transmitting the third stream ID to the host;
   receiving, from the host, a second stream control command requesting the storage device open a stream ID that is closed; and
   opening the stream ID that is closed.

2. The method of claim 1, wherein the receiving the first stream control command comprises:
   receiving a stream ID merge command requesting the storage device merge the first stream ID and the second stream ID.

3. The method of claim 1, wherein the third stream ID is a post-merge stream ID of a merged stream into which streams associated with the first stream ID and second stream ID are merged.

4. The method of claim 1, wherein the determining the third stream ID comprises:
   selecting, as the third stream ID, one of the first stream ID, the second stream ID, and an unused stream IDs.

5. The method of claim 1, further comprising:
   receiving, from the host, a write stream command, the write stream command requesting the storage device write stream data corresponding to the first stream ID or the second stream ID after the third stream ID has been transmitted thereto; and
   writing the stream data according to the third stream ID.

6. The method of claim 5, further comprising:
   notifying the host that the write stream was written to the third stream ID.

7. The method of claim 1, wherein the determining the third stream ID comprises:
   parsing the first stream control command, the first stream control command including external stream IDs;
   mapping the external stream IDs included in the parsed first stream control command with internal stream IDs; and
   determining a post-merge internal stream ID from among the mapped internal stream IDs.

8. The method of claim 7, wherein, the transmitting the third stream ID to the host comprises:
   transmitting an external stream ID to the host, the external stream ID corresponding to the determined post-merge internal stream ID as the third stream ID.

9. The method of claim 7, wherein the determining of the third stream ID is performed in a host interface layer (HIL) included in the storage device.

10. The method of claim 7, wherein the determining of the third stream ID further comprises:
    performing a pending operation on the first stream ID and second stream ID after the parsing of the first stream control command or the mapping of the external stream IDs.

11. The method of claim 7, wherein the determining of the third stream ID further comprises:
    migrating, to the third stream ID, resources assigned to the first stream ID and the second stream ID after the determining of the post-merge internal stream ID.

12. The method of claim 1, further comprising:
updating open stream IDs to differentiate a merged one of the first stream ID and the second stream ID from other open stream IDs.

13. The method of claim 1, wherein the third stream ID is a post-merge stream ID, and the method further comprises:
receiving, from the host, a third stream control command requesting the storage device close the third stream ID after the transmitting of the third stream ID;
determining a next post-merge stream ID from among open stream IDs in response to the received third stream control command; and
closing the third stream ID.

14. A method of operating a storage device that controls input/output of multi-stream data according to a stream ID, the method comprising:
receiving, from a host, a first stream control command requesting the storage device merge a plurality stream IDs into a target stream ID;
merging the plurality stream IDs into the target stream ID;
receiving, from the host, a write stream command requesting the storage device write stream data corresponding to at least one of the plurality stream IDs;
writing the stream data according to the target stream ID;
receiving, from the host, a second stream control command requesting the storage device open a stream ID that is closed; and
opening the stream ID that is closed.

15. A method of operating a storage device, the method comprising:
receiving, from a host, a first command requesting the storage device perform an operation on a data stream, the data stream being a stream of data having a unique stream ID associated therewith shared between the host and the storage device, the storage device configured to store the data in the data stream in a same block of the storage device;
merging two or more of open streams to a merged stream such that at least one of the open streams is closed to form a closed stream, if a number of the open streams exceeds a threshold;
assigning a stream ID to the merged stream;
notifying the host that the operation was performed on the stream ID associated with the merged stream;
receiving, from the host, a second command requesting the storage device perform an operation on the closed stream;
merging two or more of the open streams, if the number of open streams exceeds the threshold; and
opening the closed stream.

16. The method of claim 15, wherein the closed stream is not counted in the number of open streams.

17. The method of claim 15, wherein the assigning the stream ID to the merged stream comprises:
determining a block having a relatively large amount of available space within the storage device; and
assigning a stream ID of the block as the stream ID of the merged stream.

18. The method of claim 15, wherein multi-stream data and associated external stream IDs are transmitted between the host and the storage device via a single channel, and the method further comprises:
generating a mapping table that maps the external stream IDs with internal stream IDs associated with blocks of the storage device.

* * * * *